United States Patent [19]

Culley

[11] Patent Number: 4,835,681
[45] Date of Patent: * May 30, 1989

[54] PERSONAL COMPUTER HAVING NORMAL AND HIGH SPEED EXECUTION MODES

[75] Inventor: Paul R. Culley, Cypress, Tex.

[73] Assignee: Compaq Computer Corporation, Houston, Tex.

[*] Notice: The portion of the term of this patent subsequent to Feb. 23, 2005 has been disclaimed.

[21] Appl. No.: 89,824

[22] Filed: Aug. 27, 1987

Related U.S. Application Data

[63] Continuation of Ser. No. 626,912, Jun. 27, 1984, Pat. No. 4,727,491.

[51] Int. Cl.⁴ .............................................. G06F 12/00
[52] U.S. Cl. ................................. 364/200; 364/242.1; 364/270.3
[58] Field of Search ........ 364/200, 900, 200 MS File, 364/900 MS File

[56] References Cited

U.S. PATENT DOCUMENTS

| | | | |
|---|---|---|---|
| 3,974,479 | 8/1976 | Kotok et al. | 364/200 |
| 3,984,812 | 10/1976 | Dahlberg et al. | 364/200 |
| 4,180,854 | 12/1979 | Walden et al. | 364/200 |
| 4,218,754 | 8/1980 | Schaeffer | 364/900 |
| 4,366,540 | 12/1982 | Berglund et al. | 364/200 |
| 4,435,757 | 3/1984 | Pross, Jr. | 364/200 |
| 4,438,488 | 3/1984 | Shibayama et al. | 364/200 |

OTHER PUBLICATIONS

IBM Technical Disclosure Bulletin, vol. 27, No. 3, Aug. 1984, pp. 1695-1696.
Patents Abstracts of Japan, vol. 6, No. 70.
IBM Technical Disclosure Bulletin, vol. 26, No. 11, Apr. 1984, pp. 5788-5789.
EDN Electrical Design News, vol. 23, No. 5, Mar. 1978, pp. 42-46.

*Primary Examiner*—Thomas M. Heckler
*Assistant Examiner*—Rebecca L. Rudolph
*Attorney, Agent, or Firm*—J. David Cabello; Christopher D. Keirs

[57] ABSTRACT

A personal computer is disclosed having a high speed microprocessor which executes in either a FAST mode or a SLOW mode application programs written for a slow speed microprocessor. The slow speed microprocessor contains a pre-fetch queue that is smaller than the pre-fetch queue of the high speed microprocessor. A logic means is included, responsive to a mode select signal for controlling the wait state of said high speed microprocessor when in the SLOW speed mode so that every other word accessed to said RAM memory requires two consecutive word accesses to the same memory address to obtain the contents of the addressed location thereby enabling said high speed microprocessor to execute applications programs in the SLOW mode, on the average, at substantially the same speed as the program normally runs on the slow speed microprocessor.

4 Claims, 16 Drawing Sheets

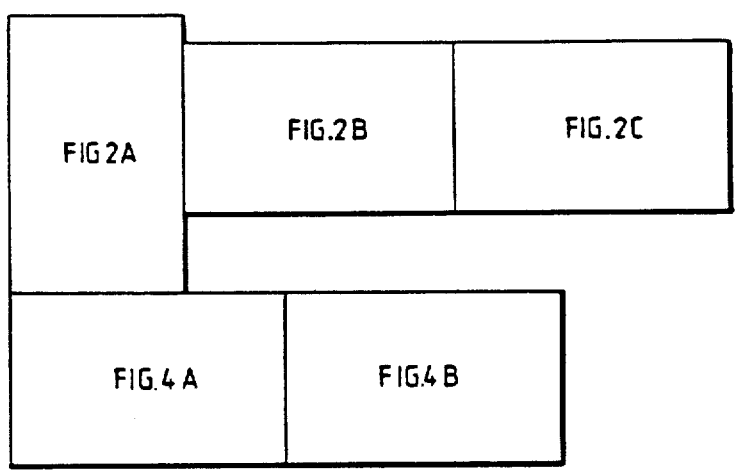
Fig.2
Fig.4
Fig.11
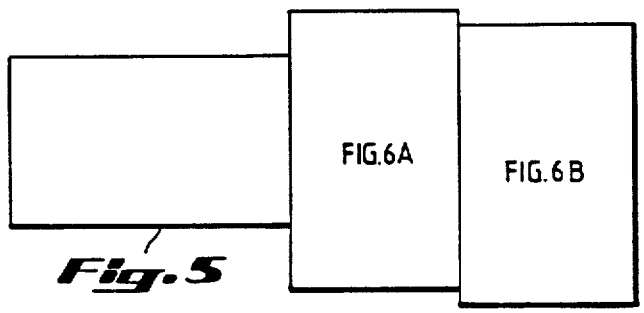
Fig.5
Fig.6
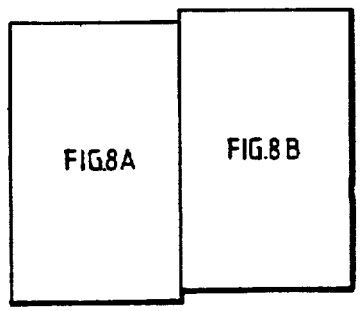
Fig.8

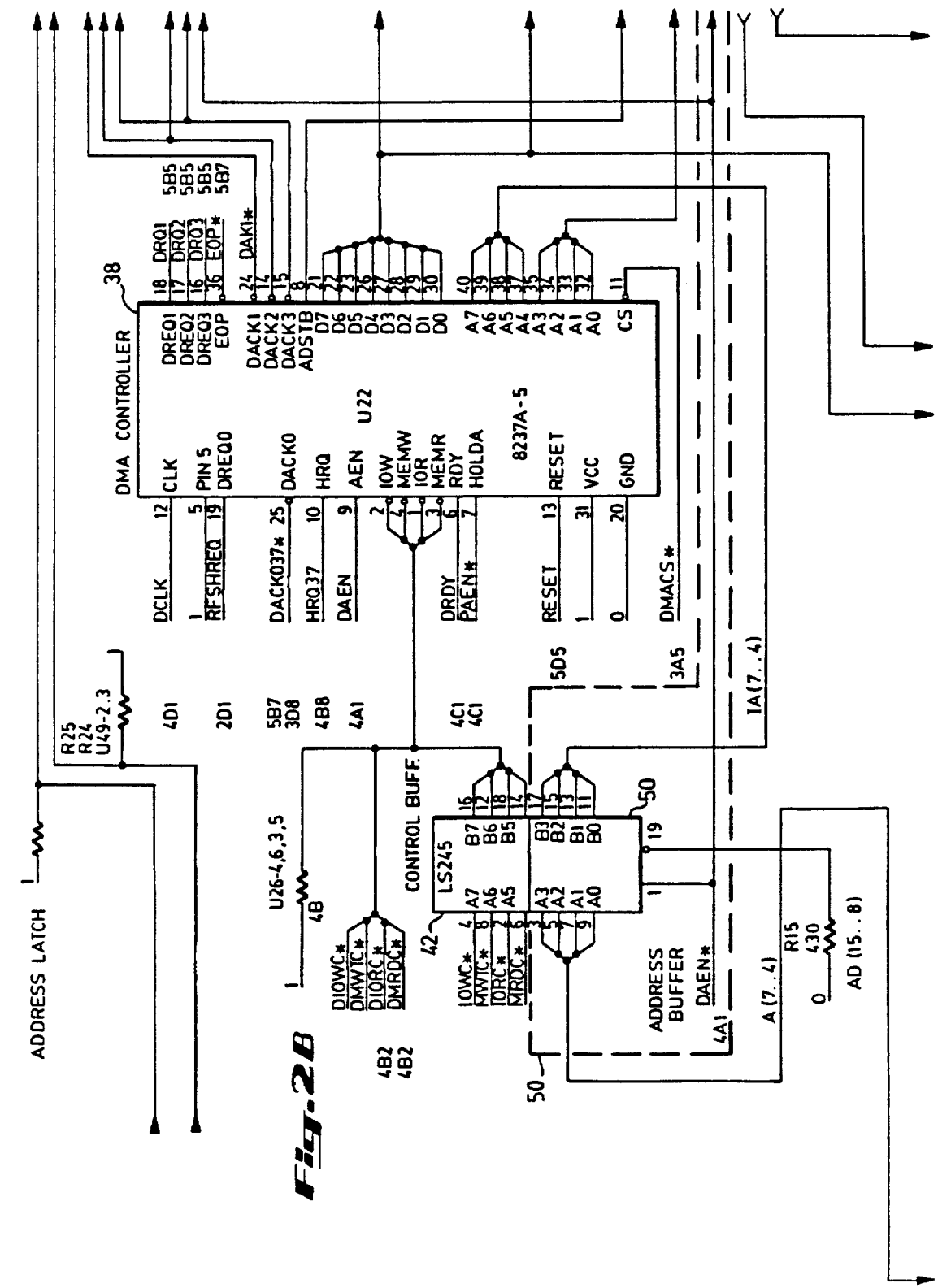

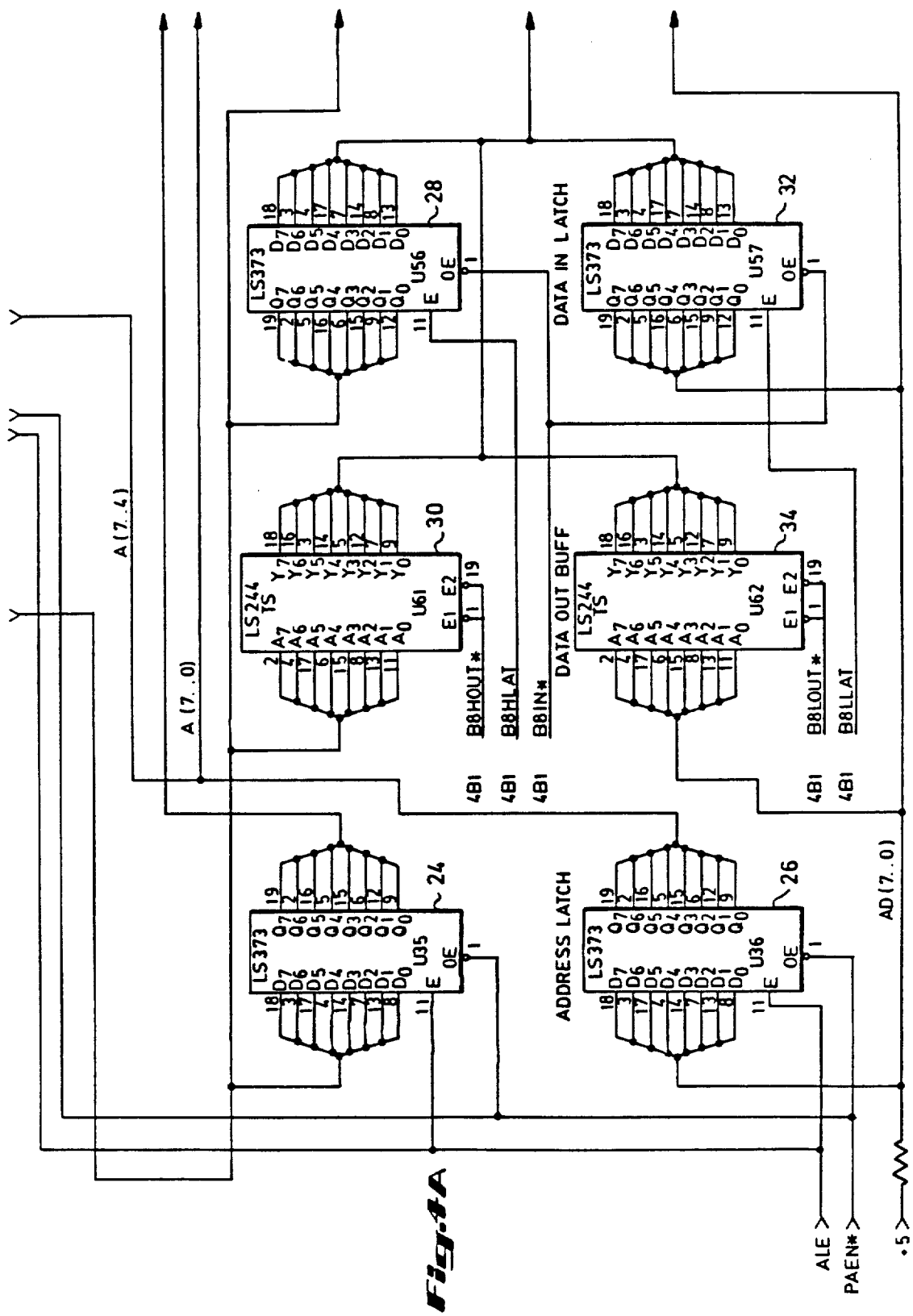

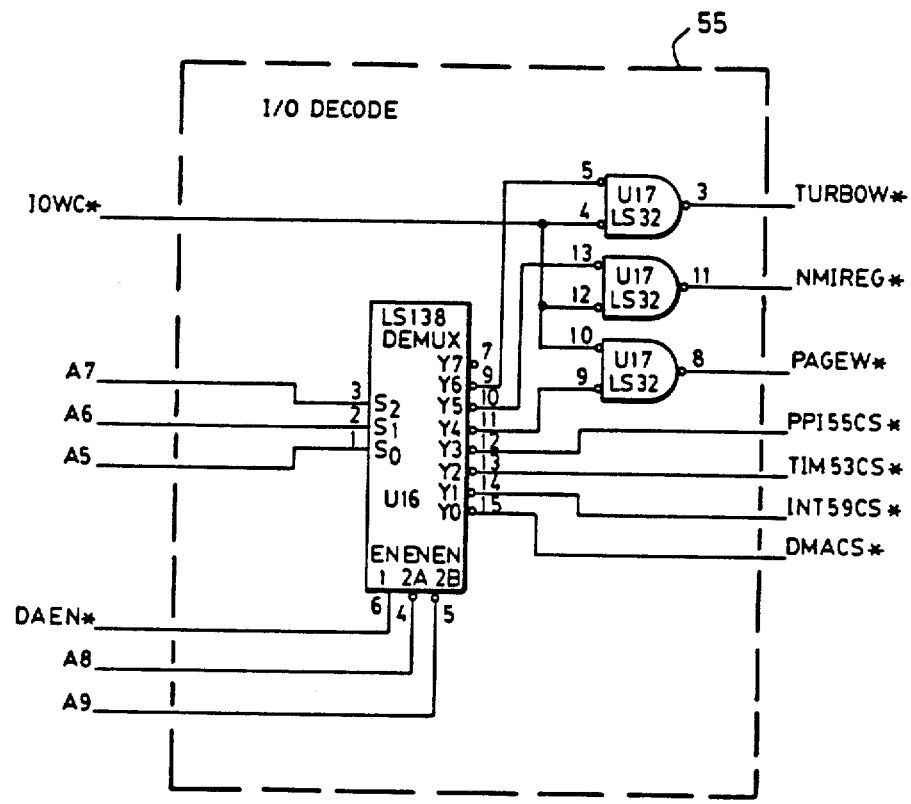
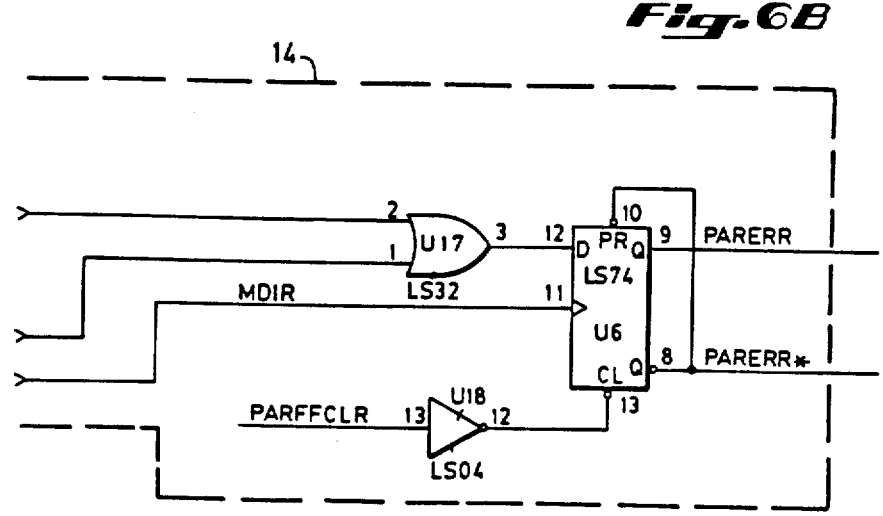
Fig. 6B

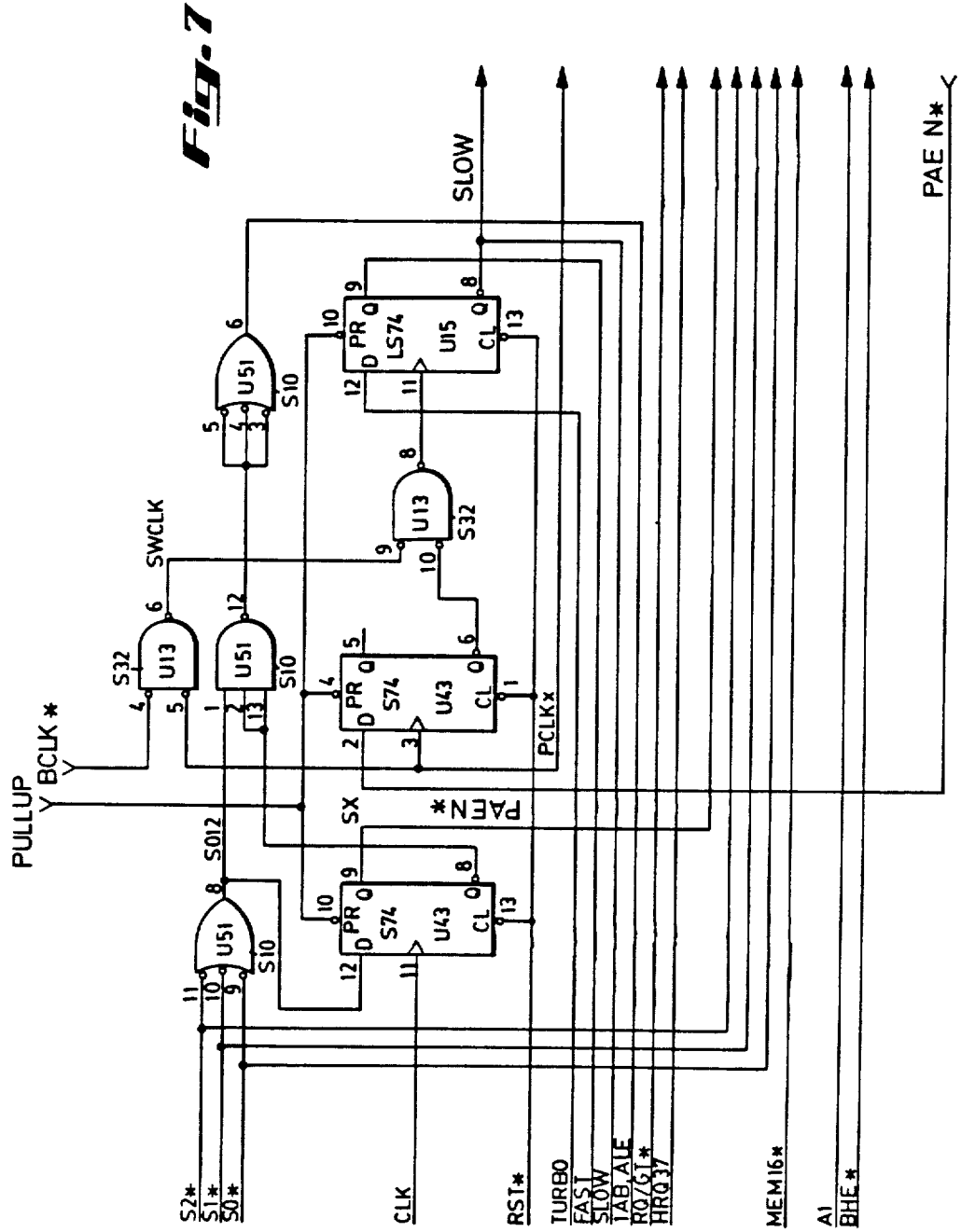

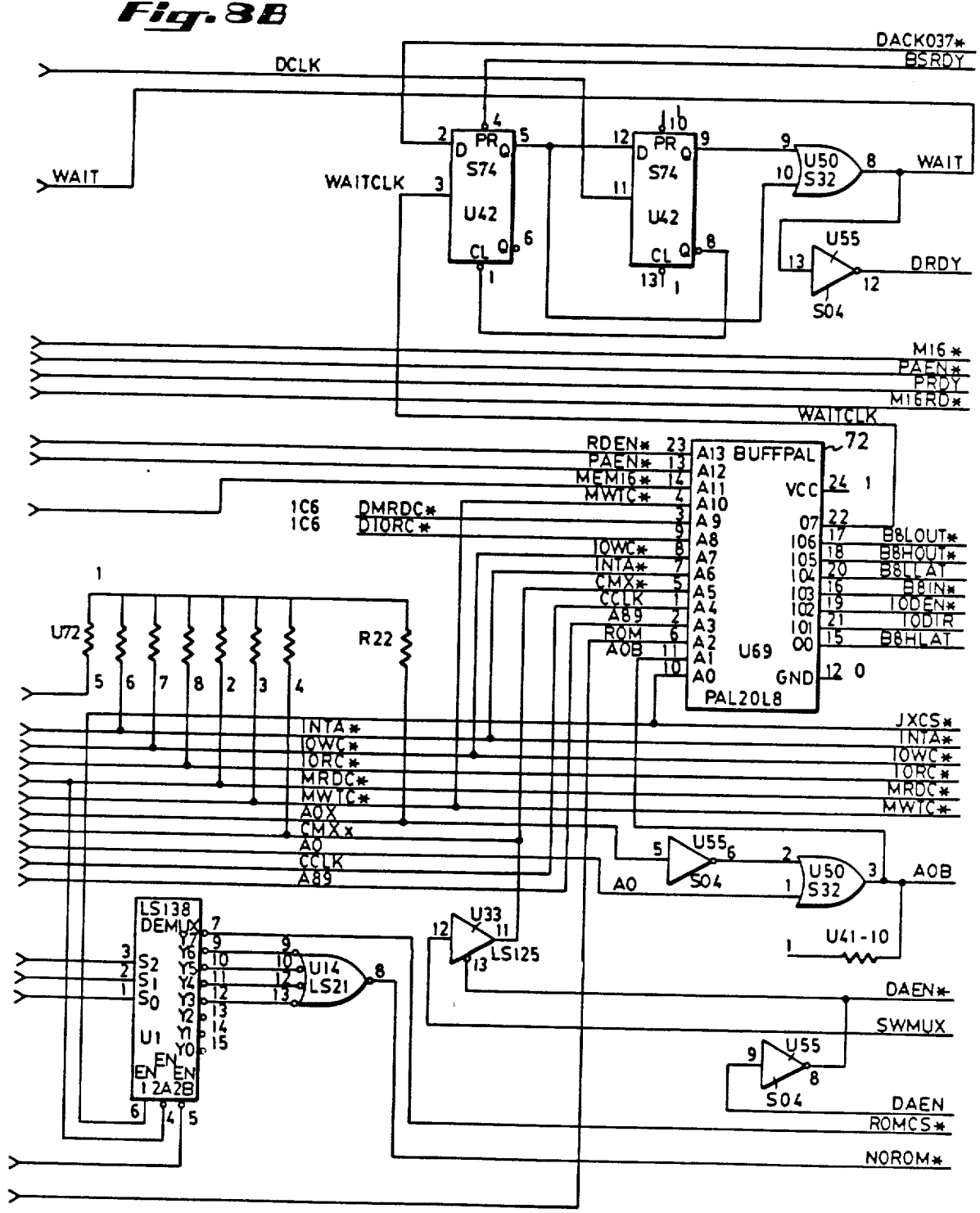

PERSONAL COMPUTER HAVING NORMAL AND HIGH SPEED EXECUTION MODES

This application is a continuation of Ser. No. 626,912, filed June 27, 1984, now issued as U.S. Pat. No. 4,727,491.

BACKGROUND OF THE INVENTION

This invention relates to personal computers designed with commercially available microprocessor chip sets. More particularly, the present invention relates to a personal computer in which the central microprocessor is controlled to execute programs in a normal high speed mode or to execute at a slow speed mode to achieve software compatibility with existing application programs, which because of their specific hardware dependency, cannot be run at the higher speed.

The introduction of the personal computer has resulted in a tremendous amount of application software programs written for both the professional and for the home entertainment market. These personal computers are designed around commercially available microprocessor chip sets which may include a plurality of microprocessors connected in an architecture which results in varying degrees of execution throughput rates.

A very popular microprocessor chip set widely used by personal computer manufacturers is the Intel Corporation 8088 microprocessor which has its particular instruction set. The same instruction set is also available in a different microprocessor from Intel, the 8086 microprocessor. The 8086 microprocessor has a substantially higher instruction execution cycle rate, almost twice as fast as the 8088. Available also from Intel is a coprocessor chip, the Intel 8087, which may be used either with the 8088 or the 8086 to achieve even higher execution throughput rates.

With the availability of a software compatible (i.e., executes the same instruction set) microprocessor, it is possible to upgrade a prior-art personal computer with higher execution speeds for some application programs written for the lower speed microprocessor chip set. While faster software compatible microprocessors are available, it is not possible, however, to simply substitute the faster microprocessor for the slower microprocessor and thereby produce a personal computer which executes at twice the speed all of the application programs written for the slower microprocessor.

Not all application programs written for the slower microprocessor are capable of running at faster microprocessor execution speeds, even though each instruction in the program is executed the same in both machines The inability to run some programs at higher speeds results from the fact that programmers, when writing for the slower microprocessor, take advantage of the particular execution cycle times in structuring routines which are time dependant. For example, video game programs rely upon the normal execution cycles times for the microprocessor in generating time intervals which are necessary for the program to perform its various functions. Running the program at higher instruction execution speeds change the resulting time intervals and thereby render the program non-functional. Application programs which are not dependent upon the execution speed typically can be run at these higher execution speeds and obtain the same results.

It is undeniable that providing a personal computer capable of executing application programs written for a slower microprocessor in half the time would be of a commercial advantage in the marketplace, but such a device would not be competitive unless it were able to execute all the application programs written for that slow speed microprocessor. For example, it is possible to provide a personal computer having an Intel 8086, 8087 microprocessor pair (a high speed microprocessor) rather than an 8088, 8087 microprocessor pair (a slow speed microprocessor) and run the high speed microprocessor at two different clocking frequencies, one for a high speed mode for those application programs which can run at the high speed and one for a slow speed mode for those application programs which are time dependent. Unfortunately, this simple clocking change does not result in a personal computer which is software compatible for all varieties of application programs.

Even though the two microprocessor chip sets, the 8086, 8088 are software compatible, the internal design of the microprocessors are not the same. This difference in internal design, depending upon the design of the application program, i.e., does it contain a lot of program jumps, affects the execution speed for a given application program. The execution time at the high speed for the high speed microprocessor is not necessarily proportionally faster than the execution time when the microprocessor clock is set to the slower normal frequency for the slow speed microprocessor. Stated differently, reducing the microprocessor clock from its high speed mode to the normal clock for the slow speed microprocessor while keeping all else the same does not result in the same execution time for a given application program to run on the high speed microprocessor as occurs if the same program is run on the slow speed microprocessor.

For the Intel 8086 microprocessor, simply reducing the clocking frequency to the normal frequency of the 8088 microprocessor results in an execution speed which is faster than it would have been for the slow speed 8088 microprocessor chip. This faster execution speed results from the internal design difference which exists between the two microprocessors, and the fact that the 8086 requires 16-bit fetches from memory while the 8088 requires 8-bit byte fetches.

The internal design difference between these two microprocessors is primarily in the amount of pre-fetch buffer memory provided in the microprocessor. In the Intel 8088, there is four bytes of pre-fetch queue while in the 8086, there is six bytes of pre-fetch queue. Each microprocessor is designed to keep its pre-fetch queue full with information in order that the microprocessor can continue to execute code, which on the average, achieves a desired execution throughput rate. When program jumps occur, the contents of the pre-fetch buffer are lost. This loss of information is reflected in wasted execution time because of the time required to obtain the pre-fetch information that is thrown away. Thus, the 8088 microprocessor, having four bytes of pre-fetch queue running at a given clocking frequency and fetching 8-bit bytes per fetch cycle would produce a different execution throughput then the 8086, having six bytes of pre-fetch queue running at the same clocking frequency but fetching 16-bit bytes per fetch cycle. It is because of this difference in the pre-fetch buffer capacity and the rate at which 8-bit bytes are fetched from memory that the 8086 runs at a faster speed for the same application program when the 8086 microprocessor is run at the same closing frequency as is normally used for the 8088.

Therefore, it would be advantageous to provide a personal computer which provides for a high speed microprocessor to execute application programs which are not time dependent at high speeds, but providing a lower normal speed execution of those application programs which are time dependent so that the time dependent application programs appear to be running at substantially the same execution speed as they would have run on the microprocessor for which they were written.

SUMMARY OF THE INVENTION

In accordance with the present invention, there is disclosed a personal computer having a high speed microprocessor that is responsive to a mode select signal for executing in either a fast mode or a slow mode, application programs written for a slow speed microprocessor. The slow speed microprocessor is software compatible with the high speed microprocessor and has an internal pre-fetch queue with a first number of bytes of memory. The high speed microprocessor includes an internal pre-fetch queue with a second number of bytes of memory. The first number of bytes of pre-fetch queue in the slow speed microprocessor is less than the second number of pre-fetch queue in the high speed microprocessor.

The personal computer further includes a RAM memory having each word comprised of a plurality of bytes, a clock generator responsive to the mode select signal for generating the clock signal to the high speed microprocessor such that in the slow mode, the clocking frequency is the same as the normal clocking frequency for the slow microprocessor and in the fast mode is higher than the clocking frequency for the slow speed microprocessor.

The personal computer also includes a logic means responsive to the mode select signal and the clock generator for controlling the wait state of the high speed microprocessor when in the slow speed mode so that every other word access to the RAM memory requires two consecutive word accesses to the same memory address to obtain the contents of the addressed location. In this manner, the high speed microprocessor executes the application programs in the slow mode, on the average, at substantially the same speed as the program normally runs on the slow speed microprocessor.

BRIEF DESCRIPTION OF THE DRAWINGS

For a fuller understanding of the present invention, reference should be had to the following detailed description of the preferred embodiment of the invention taken in conjunction with the accompanying drawings in which:

FIGS. 2A, 2B, 2C, 4A, and 4B should be oriented and aligned in the manner shown in FIG. 11.

FIGS. 5, 6A and 6B, when oriented and positioned as shown in FIG. 11, illustrate the RAM memory and address multiplexer and memory control logic as shown in FIG. 1;

FIGS. 7, 8A, and 8B when FIG. 7 is placed to the left of FIGS. 8A and 8B and where FIGS. 8A and 8B are positioned and oriented as shown on FIG. 11, illustrate a detailed circuit diagram of the request/grant wait logic, the bus controller, and the buffer control as shown in FIG. 1;

FIG. 11 illustrates the positioning and orientation of FIGS. 2A, 2B, 2C, 4A, 4B, 5, 6A, 6B, 8A and 8B. FIGS. 2A, 2B, 2C will hereafter be referred to collectively as FIG. 2; FIGS. 4A and 4B will hereafter be referred to collectively as FIG. 4; FIGS. 6A and 6B will hereafter be referred to collectively as FIG. 6; and FIGS. 8A and 8B will hereafter be referred to collectively as FIG. 8.

Similar reference numerals refer to similar parts throughout the several views of the drawings.

DETAILED DESCRIPTION OF THE PREFERRED EMBODIMENT OF THE INVENTION

Figure 1:
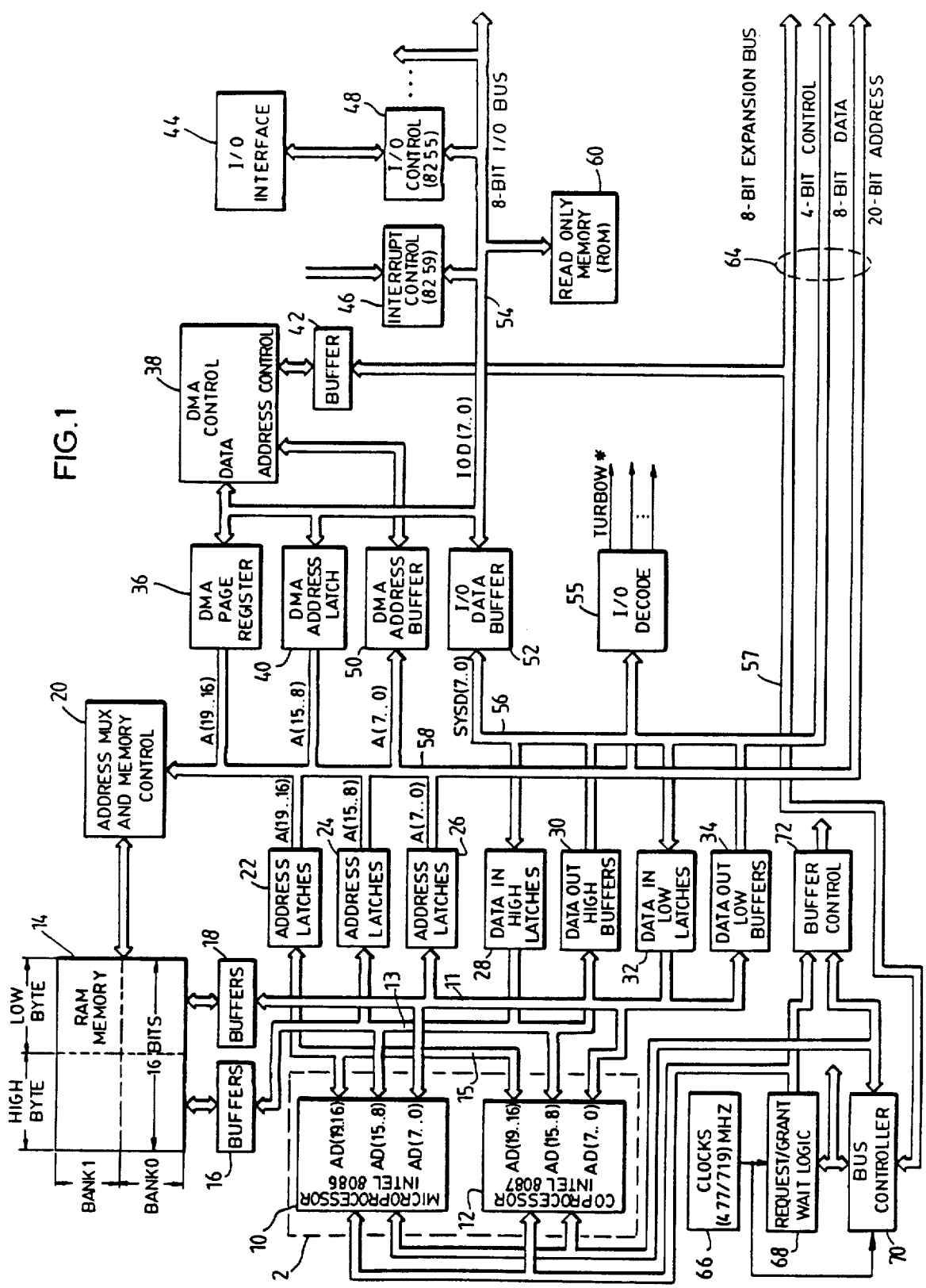
FIG. 1 is a functional block diagram of the architecture of the present invention.

Throughout the following detailed description of the preferred embodiment of the present invention, and as shown in the accompanying drawings, the following notation has been adopted for indicating signals. Since the terms "1" or "0" and "true" or "false" can be ambiguous, their use is avoided. In their place the terms "logic high (H)" and "logic low (L)", in association with "active" and "inactive" states for the signals has been used. An asterisk (*) following a signal name indicates that the signal is "active" when low. For example, the microprocessor 10 state control line S0* is active when at a logic low state, while the microprocessor 10 ready signal PRDY is active when in the logic high state. The signals are "inactive" when in the logic state opposite to its "active" logic state. In our example, S0* is inactive when in the logic high state, and the signal PRDY is inactive when in the logic low state.

Certain logic circuit functions of the preferred embodiment of the present invention have been constructed using programmable array logic (PAL) chips in implementing the combinational logic required to combine certain ones of the logic signals to obtain additional logic signals. For such devices, the combinational logic circuits implemented with the PAL chips are neither shown in the drawings or discussed in the specification; however, the logic design data for producing each PAL chip contained in the invention and illustrated in the drawings is provided in this specification as an appendix entitles "Appendix for PAL Design Data". This design data presents the logic equations for combining the input signals to produce the output signals indicated in the drawings. For these design equations and the type of PAL chip to be programmed, it is possible to produce the particular chip using standard manufacturing techniques suggested by the PAL manufacturer.

Turning now to the FIGS., and first to FIG. 1, there is shown a functional block diagram of the logic circuits of a personal computer in accordance with the present invention. The personal computer is designed around the central processing units comprised of microprocessor 10 and coprocessor 12 (The two microprocessors, e.g., microprocessor 10 and coprocessor 12 are hereinafter sometimes referred to as "microprocessor 2"). In the preferred embodiment of the present invention, microprocessor 10 is the Intel Corporation 8086 microprocessor, and the coprocessor 12 is the Intel 8087 coprocessor.

Microprocessor 2 is a 16-bit microprocessor having addressing capability of 20 bits. As shown in FIG. 1, the address lines for the microprocessor 2 are multiplexed with the data and are divided into three busses, AD(7 . . . 0), AD(15 . . . 8), and AD(19 . . . 16). The lower 16 bits of the address/data lines are divided into the low byte (AD(7 . . . 0)) bus 11 and the high byte (AD(15 . . . 8)) bus 13.

Connected to the high and low byte address/data busses 13, 11, respectively, are associated bidirectional buffer units 16 and 18 which buffer the data in and out of the RAM memory array 14. The RAM memory 14 is divided into a lower bank 0 and an upper bank 1 as well as divided into high and low byte sections. The arrangement of the RAM memory 14 is in accordance with standard techniques which are widely known to those skilled in the art. In order words, the 16-bit words of the RAM memory 14 are outputted as high and low bytes with 8 bits per byte through the buffers 16 and 18 onto the high and low byte address/data busses of the microprocessor 2.

The four upper address/data lines from the microprocessor 2 comprise a third bus 15 which is associated only with the address of the RAM memory 14. Address latches 22, 24, and 26 respond to the three busses from the microprocessor 2 to latch in a memory address from the microprocessor. The output from the address latches 22, 24, and 26 comprise the address bus 64. The address bus 58 is applied to the address MUX and memory control circuit 20 associated with the RAM memory 14 for providing the address to the RAM. The address MUX and memory control logic 20 also responds to DMA operations to the RAM memory 14 under control of the DMA control 38.

The DMA control 38 may specify an address to the RAM memory 14 via the DMA page resistor 36, DMA address latch 40, and DMA address buffer 50. The data to be stored in the RAM memory 14 under control of the DMA control 38 is provided to the buffers 16, 18 via the I/O data buffer 52 which couples the 8-bit data bus 54 (IOD (7 . . . 0)) from the DMA control 38 to the internal data bus 56 (SYSD (7 . . . 0)). The internal data bus 56 is connected to each of the data-in high latches 28, the data-out high buffers 30, the data-in low latches 32, and the data-out low buffers 34. The data-in high latches 28 and data-out high buffers 30 are each connected on the output side to the microprocessor 2 high byte address/data bus 13 which in turn couples buffers 16 to the RAM memory 14. The data-in low latches 32 couple the data bus 56 to the microprocessor 2 low byte address/data bus 11 which in turn couples to the buffers 18 to the RAM memory 14.

The data bus 54 is an 8-bit input/output bus which couples the input/output devices to the microprocessor 2. In accordance with the present invention, the system read only memory (ROM) 60 is coupled to this 8-bit I/O data bus 54. The address and data to the system ROM 60 is multiplexed onto the I/O data bus 54 via the I/O data buffer 52 and the data-out high buffers 30 and data-out low buffers 34 which are respectively connected to the microprocessor high address/data bus 13 and low address/data bus 11. The system ROM is connected to the 8-bit data bus 54 by design choice. It could have been connected to the 16-bit busses (13, 11), but would have required two ROM chips, one for the high byte and one for the low byte.

Connected to the 8-bit I/O data bus 54 are standard I/O logic devices, such as the interrupt control 46 and the I/O controller 48, which for the presently preferred embodiment respectively comprises an Intel 8259 interrupt controller and an 8255 I/O controller. The operations of these devices are in accordance with standard procedures noted by Intel and which are well-known to those skilled in the art. Accordingly, a more detailed description of their operation will not be provided herein.

Still referring to FIG. 1, the local system bus 56 together with the address bus 58 and a plurality of control lines 57 together comprise the 8-bit expansion bus 64 which is used to expand the architecture of the present invention to add additional hardware peripheral devices. The control bus 57 comprises a plurality of control lines (in the case of the present invention, 4 bits of control) that originate with the bus controller 70.

In accordance with the present invention, there is provided a personal computer that is both hardware compatible with existing peripheral devices designed for certain classes of personal computers and is software compatible with a majority of application programs which have been written for that class of computers. That is, the 8-bit expansion bus 64 is designed to run at all times at a throughput rate which is equal to the rate for which the hardware was designed. An increase in the execution speed of the microprocessor 2 above the speed with which the prior art personal computers have been designed does not affect the data transfer rate over the 8-bit expansion bus 64 from the rate for which the hardware was designed. In accordance with the presently preferred embodiment, the clocking rate for the 8-bit expansion bus 64 is 4.77 MHz in both the high and low speed mode of execution for the microprocessor 2.

Still referring to FIG. 1, as mentioned, microprocessor 10 is an Intel 8086 microprocessor. This particular microprocessor chip has a significantly higher execution speed than its sister microprocessor, the Intel 8088. The Intel 8088 microprocessor chip is a very popular chip which has found widespread use by several manufacturers of personal computers. A great deal of application software was written for these personal computers using the instruction set available in the 8088 microprocessor. This instruction set is also available in the Intel 8086 microprocessor 10. This software compatibility enables the instructions in a program written for the 8088 to execute on the 8086. However, it is not possible simply by providing an Intel 8086 microprocessor in a personal computer to successfully run all application programs written for the Intel 8088. This problem results from the fact that some application software is time-dependent in that the programmers have taken advantage of the execution speed of the 8088 in creating certain time intervals required by the routines to perform certain functions. This type of situation is very common in video games software. Without modifying this application software, going to a high execution speed microprocessor in effect changes these time intervals and renders these programs inoperative.

In accordance with the present invention, the architecture shown in FIG. 1 provides for a dual mode of operation for the microprocessor 2 to take advantage of the high speed execution cycle time for the Intel 8086 where application programs can run at these higher speeds, and to have a slow mode to handle the application programs which rely upon the execution cycle time for the microprocessor for which the program was written.

Although the high and slow speed microprocessor chips from Intel are software compatible, i.e., they both execute the same instruction set, it is not possible to simply provide the high speed microprocessor 10 and run it at a slower clock frequency normally provided to the slow speed microprocessor and have the high speed microprocessor execute the application program at the same speed as occurs when the program is executed on the slow speed microprocessor. The reason is that the internal architecture of the microprocessors is different.

In the high speed microprocessor, Intel has provided a 6-byte buffer pre-fetch queue memory while in the low speed microprocessor Intel has provided a 4-byte pre-fetch buffer memory. For application programs which provide for program jumps, and almost all application programs do, this additional amount of pre-fetch buffer memory provided in the high speed microprocessor would appear to represent an additional overhead time required by the 8086 microprocessor to pre-fetch the data that is supposed to be in the pre-fetch buffer memory. In fact, it does not because the 8086 microprocessor is doing 16-bit word fetches from RAM memory 14 (two 8-bit bytes per word). It only takes the 8086 three fetch cycles to obtain the six bytes of pre-fetch data while the 8088 running at the same clocking frequency and obtaining one 8-bit byte per fetch require four fetch cycles to obtain four bytes of pre-fetch data.

Thus, simply reducing the clocking frequency to the microprocessor 2 from the high speed clock to the normal clocking frequency for the slow speed microprocessor results in the high speed microprocessor executing application programs faster than would occur for the slow speed microprocessor running at the same clocking frequency.

On the other hand, controlling the microprocessor 2 to operate in an 8-bit access mode all the time, the amount of time required to fill the pre-fetch queue, i.e., obtain the 6 bytes of pre-fetch data would require 6 fetch cycles while the slow speed microprocessor would only require 4 fetch cycles. In this mode, the high speed microprocessor 10 would execute the application program slower than the slow speed microprocessor would for the same clocking frequency.

To achieve, as near as possible, the same execution time in a high speed microprocessor running in the slow speed mode the same execution time for application programs as realized in a slow speed microprocessor, the present invention discloses an algorithm wherein every other access to the RAM memory 14 by the high speed microprocessor 2 is a word fetch. Between word fetches 8-bit byte modes accesses are implemented. In this manner, on the average, the number of accesses to the RAM memory 14 will be approximately equal to the 4 fetch cycles required for the 8088.

This average result depends upon what access was occurring when the last program jump occurred, whether it was a word access or an 8-bit byte access. In other words, some of the time, the pre-fetch operations following a jump will begin with a word fetch cycle in which two bytes of pre-fetch data are obtained followed by a word cycle fetch that is ignored by the microprocessor 2 (the microprocessor is put into WAIT state) followed by the same request which is not ignored by the microprocessor 2 (the microprocessor is released from the WAIT state) to obtain the next two bytes of pre-fetch, then followed by an additional word cycle request to obtain the final two bytes. For this situation, a total of four fetch cycles occurred in order to obtain the six byte of pre-fetch data. For the other situation, the six bytes of pre-fetch would be obtained by a word access that is ignored by the microprocessor 2, followed by word access to the same location which is used to obtain the first two bytes. Following this would be a word access which would obtain the next two bytes, followed by a word access that is ignored, followed by a word access to the same address to obtain the final two bytes of pre-fetch data. For this situation a total of five fetch cycles would be used. Accordingly, on the average, the amount of time required to obtain the pre-fetch data required by the high speed microprocessor 2 when running at slow speed is approximately equal to that which is required by the slow speed microprocessor. For the most part the program execution time for the high speed microprocessor running at the slow speed is approximately the same as a slow speed microprocessor running at the normal clocking frequency. Achieving approximately the same program execution speed for a high speed microprocessor, e.g., 8086 (running at the slow speed) as the execution speed for slower microprocessor, e.g., 8088 at the normal clocking frequency results in performance which is essentially the same and therefore commercially acceptable.

In order for the present invention to achieve the pre-fetch data required by the high speed microprocessor when running at the slow speed, it is necessary that for every other word access cycle from the microprocessor 2 that the microprocessor 10 be put into a WAIT state so that the 16 bits of data which are read from the RAM memory 14 are ignored while the data access to the same memory location 14 in the following fetch cycle produces the same 16 bits of information actually strobed into the microprocessor 10. In this way, it takes two fetch cycles to produce the two bytes of pre-fetch data contained in a single RAM memory 14 word. The request/grant wait logic 68 responds to the clock circuit 66 to produce the necessary control signals to the microprocessor 2 to produce these wait states. The bus controller 70 also responds to the clocking generator 66 and the request/grant wait logic 68 to control the buffer control 72 that in turn controls the various address latches, data buffers and latches, etc. to control the flow of data throughout the architecture of the present invention.

Figure 2A:
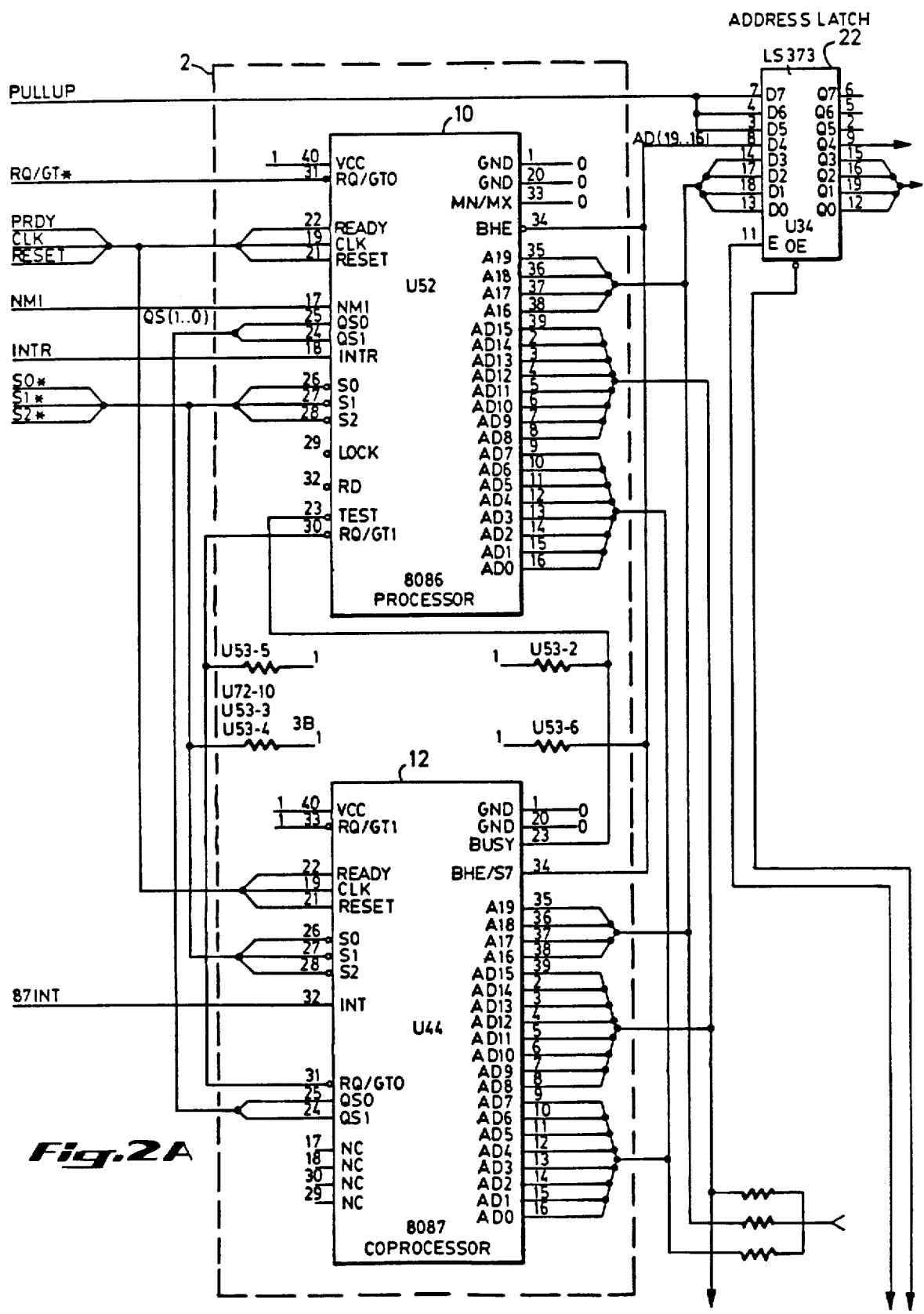
Figure 2C:
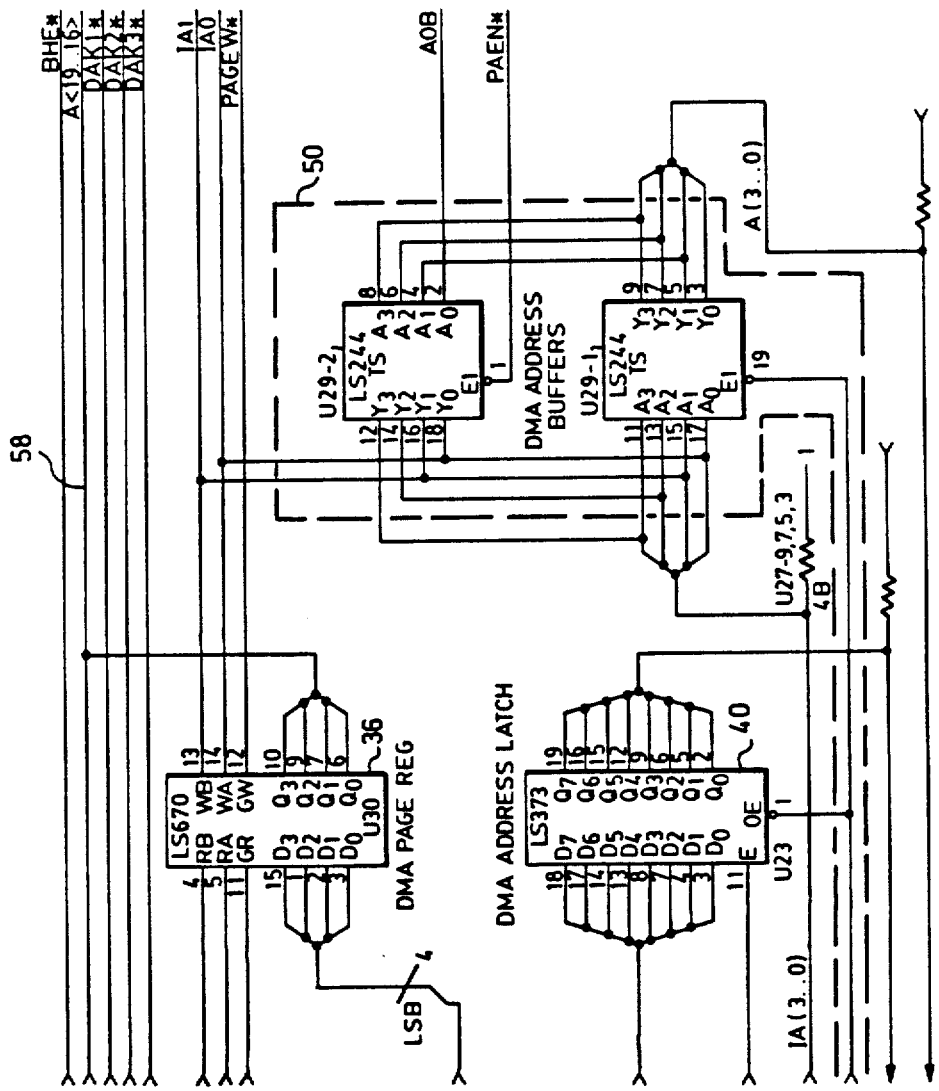
Figure 3:
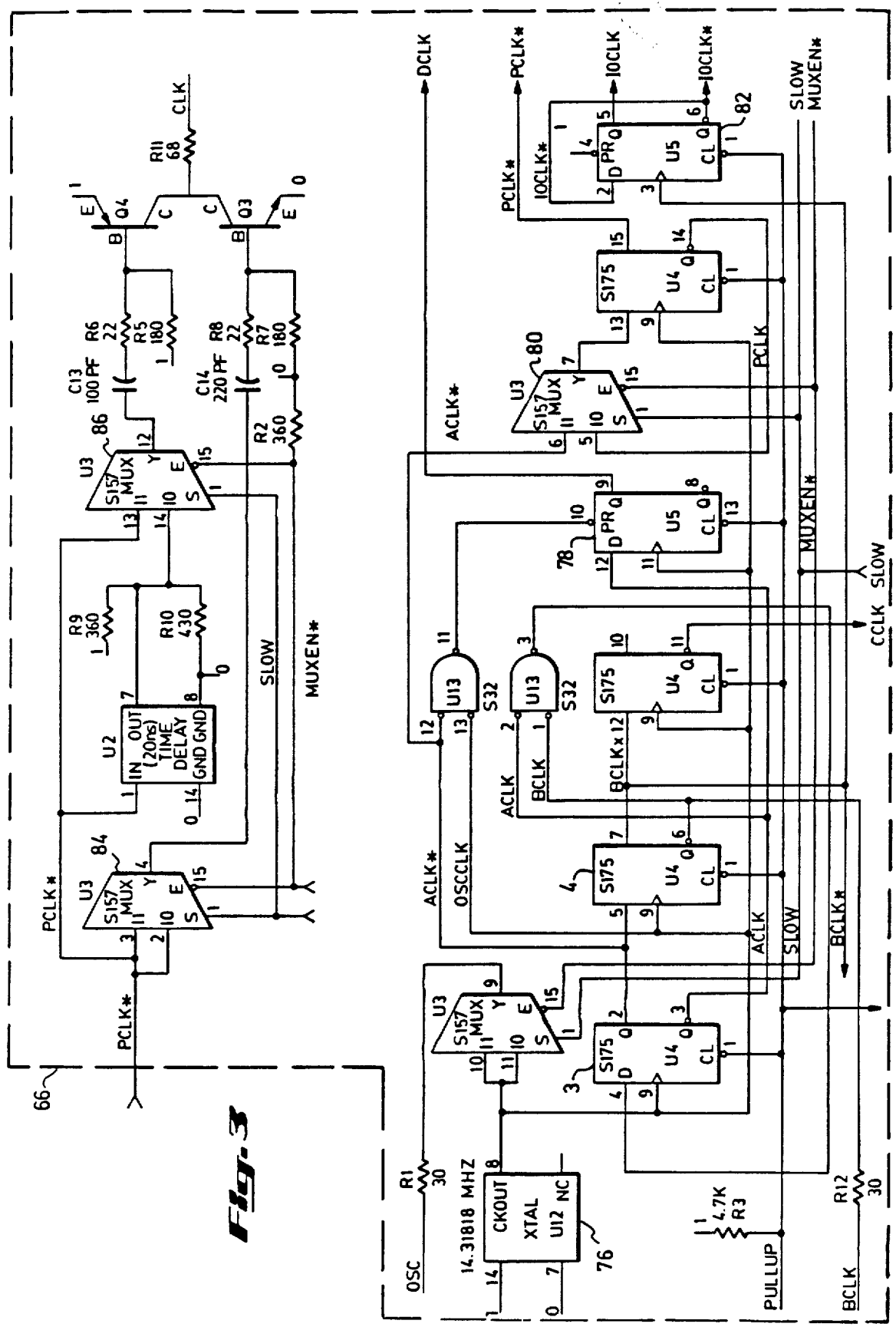
FIG. 3 should be placed to the right of FIG. 2C. As such, these Figures comprise a detailed circuit diagram of a portion of the architecture of the present invention shown in FIG. 1, and includes the 8088 and 8087 microprocessor pair and the clock generation circuits.
Figure 4B:
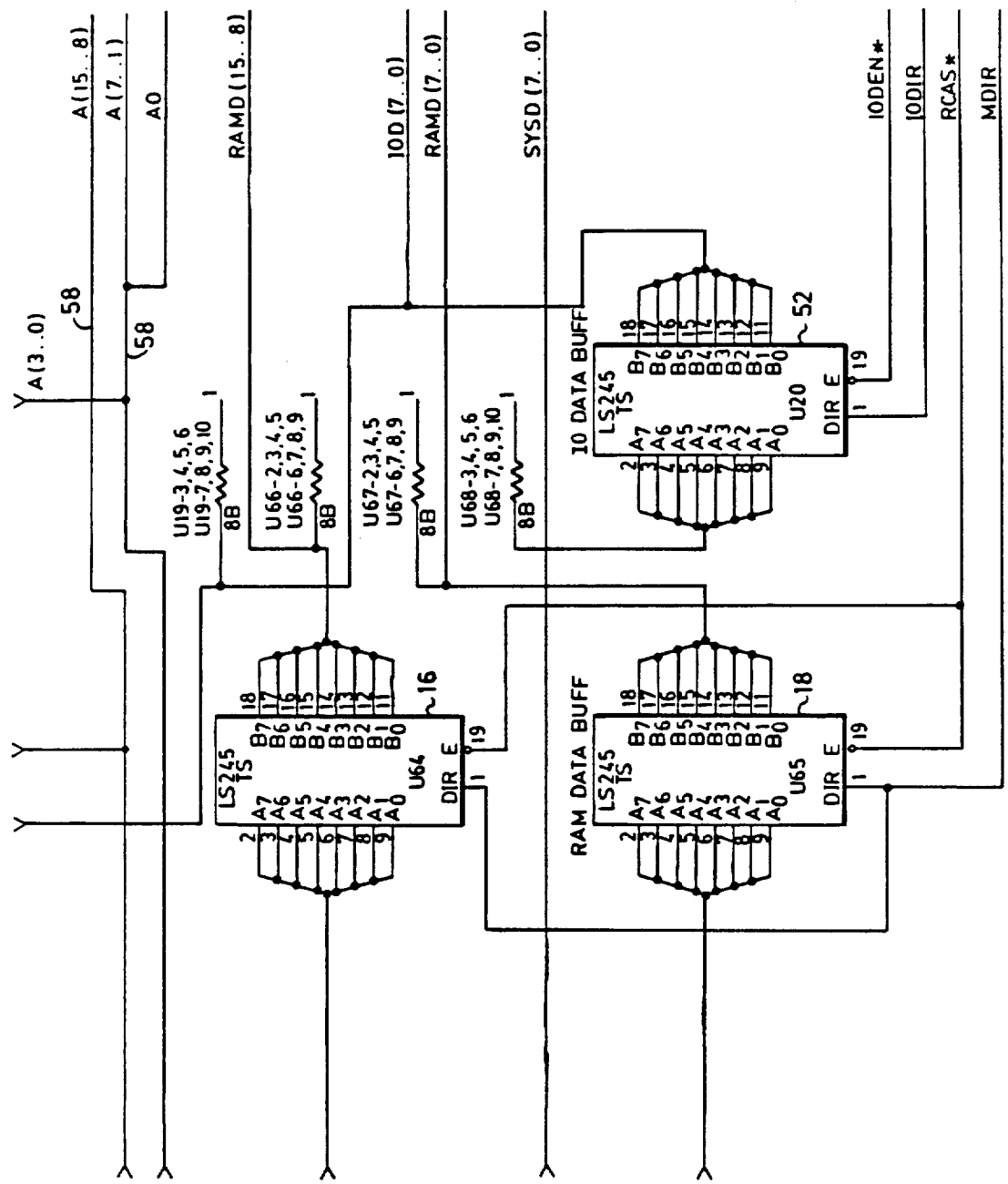

Referring now to FIGS. 2, 3, and 4, and placing FIG. 3 to the right of FIG. 2 and FIG. 4 below FIG. 2, illustrates a detailed circuit diagram of the interconnection between the microprocessor 2 and the DMA control 38. The plurality of address latches 22, 24, and 26 which interface the addresses from the multiplexed address-/data lines from the microprocessor 2 to the address bus 58 are shown in FIGS. 2 and 4. The data-in latches 28, 32, the data-out buffers 30, 34, and the RAM data buffers 16, 18 are shown in FIG. 4. Also shown in FIG. 4 is the I/O data buffer 52 which interfaces the data bus 56 to the data bus 54 as shown in FIG. 1.

Also shown in FIG. 3 is the logic circuit of the clock generator 66. The clock generator produces several system clocks from a single 14.31818 MHz crystal oscillator device 76. The system clocks generated are the microprocessor 2 clock CLK, the DMA control 38 clock DCLK, clocks that synchronize the system bus related circuitry BLCK and BCLK*, a clock equivalent to an inverted microprocessor 2 clock PCLK*, and a clock for timing I/O devices IOCLK.

To simplify the system design, several of the system clocks are designed to be synchronous within a very few nanoseconds of each other. This is accomplished by using flip-flops within a single IC to generate the synchronous clocks. By using high speed logic, timing skews are held to a minimum thereby providing stable reference points for other system timing.

Referring now just to FIG. 3, the master system clock MCLK from the crystal oscillator has a frequency of 14.31818 MHz and a period of 69.84 nanoseconds. The oscillator produces an approximately 50% duty cycle clocking signal and most of the clocks described as follows are developed from the master lock MCLK's rising edge.

The system clock BCLK is the division of MCLK by three with a 33% duty cycle in the logic high state. The period for this clock is 209.5 nanoseconds. The system clock BCLK* is the inverse of BCLK.

The system clock ACLK is similar to BCLK, but is phase shifted one MCLK cycle later than BCLK. ACLK and BCLK are developed by two flip-flops 3, 4 which are connected as a 2-bit shift register. The input to the register is given by the following logic equation (ACLK+BCLK)*.

The system clock CCLK is the clock signal BCLK delayed by one MCLK cycle time period. It is used to operate the state machines (CPU PAL 68 and BUS PAL 70, see FIG. 8) to produce the bus commands and the buffer control commands.

The system clock SWCLK (see FIG. 7) is used to time the switch of the processor clock from fast to slow mode so that the processor clock does not violate the requirements of the microprocessor 2. It is the OR functions of BCLK* and PCLK* so that it goes low for one MCLK cycle time every other time BCLK* goes low during the FAST mode. During the SLOW mode, it is equal to the clocking signal BCLK*.

The system clock DCLK is synchronous on the falling edge with the falling edge of BCLK, but is adjusted on the rising edge to be more nearly a 50% duty cycle clock. This is accomplished by presetting flip-flop 78 to a logic high state on the falling edge of MCLK halfway through the DCLK cycle.

The system clock PCLK* runs at one of two frequencies depending upon the mode of the processor system. In the FAST mode, PCLK* is a divide by two of the MCLK with a frequency of 7.16 MHz and a period of 139.68 nanoseconds. In the SLOW mode, PCLK* is the same as BLCK*. This is accomplished by using a multiplexer 80 to switch the input of the PCLK* flip-flop 82 from ACLK* to PCLK.

The system clock CLK is the processor clock, and has the same two frequencies as PCLK*. It's falling edge is nearly synchronous with the rising edge of PCLK* except for propagation delays through certain logic circuits. In the SLOW mode, PCLK* goes through two parts of multiplexer 84 and is buffered by a clock driver to form the signal CLK. The CLK signal will have the inherent 33% duty cycle of the divide by three counter, except for the different high/low delays of the MUX and driver flip-flop. In the fast mode, the multiplexer 86 which drives the clock driver selects a version of the PLCK* which is delayed by a delay line for 20 nanoseconds. This is to adjust the CLK output to be more nearly 33% duty cycle at this higher frequency.

The clock driver is C coupled to the multiplexer 84 so that each of the driver transistors Q3, Q4 will be turned on for only a portion of the cycle time, about 25 nanoseconds. This is required to prevent both transistors from being turned on at once by storage time problems or the differential delay in the paths driving each transistor. The capacity of load on the CLK line (100pf max) will keep the CLK signal from decaying in the 115 nanosecond (max) time when the transistors are not turned on.

The IOCLK is a divide by two of the BCLK* clock. The frequency of IOCLK is 2.3863633 MHz yielding a period of 419 nanoseconds. The IOCLK clock does not require a fixed phase relationship with the other system clock as it is used only for counting time.

For the system clocks mentioned above (CLK, PCLK*) which are switched in frequency, the switching occurs during any DMA cycle. This is to prevent the bus control state machines from becoming confused by a mode switch during their active times. In addition, the mode switch from FAST to SLOW mode occurs when the phase relationship of BLCK and PCLK are such that PCLK has just gone low and will remain low for two and only two MCLK cycles after the mode switch. This is accomplished by gating PAEN with the signal SWCLK to synchronize the TURBO control line and form the signal SLOW (the mode select signal). This will allow a smooth transition of the bus state machines and provide a clean clock transition. (See FIG. 7 for the generation of the signal SLOW.)

Figure 8A:
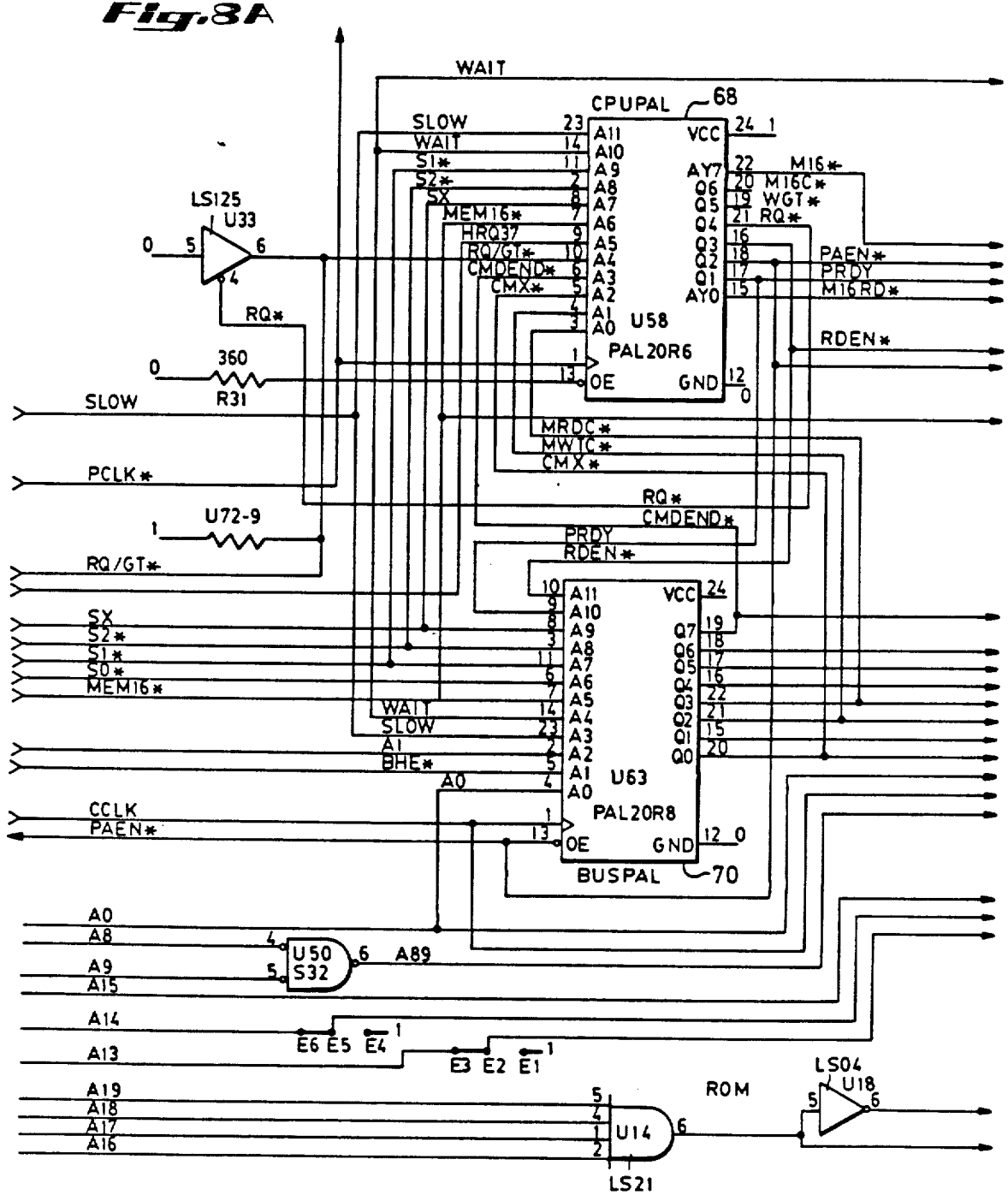

Turning now to FIGS. 7 and 8 and placing FIG. 8 to the right of FIG. 7, a detailed circuit diagram is illustrated of the request/grant wait logic 68, the bus controller 70, and the buffer control logic 72 shown in FIG. 1. The function of the request/grant wait logic 68, the bus controller 70, and the buffer controller 72 is to replace the normal controller functions of Intel's 8288 bus controller and 8284 ready logic which are normally associated with the use of Intel's 8086 microprocessor and 8087 coprocessor.

Referring to FIG. 8, there is shown CPUPAL 68 which is a 6 register, 2 normal output PAL device. It is clocked by the PCLK* clock. The design equations for the programming of CPUPAL 68, as well as all of the other PALs discussed below, are given in the PAL design equation appendix.

Still referring to FIG. 8, the rising edge of PCLK* is nearly synchronous with the falling edge of the microprocessor 2 clock CLK. The logic in the CPUPAL 68 implements the hold request/hold acknowledge to RQ/GT conversion (PAEN*, RQ*, and WGT*), some of the processor ready logic (PRDY), and the logic which starts request on the 16-bit memory (M16*, M16C*, and M16RD*).

Also shown in FIG. 8 is the BUSPAL 70 which is an 8 register tri-state output PAL device. The BUSPAL 70 is clocked by the CCLK clock. The rising edge of this clock is the same as the falling edge of the microprocessor 2 clock in the SLOW mode. The logic in the BUSPAL 70 generates the 5 bus commands (MRDC, MWTC, IORC, IOWC, and INTA), signals which indicate the end of a command (CMDEND and CMX), and the high byte of each word access to the 8-bit bus 54. The outputs of the BUSPAL 70 are only enabled when the microprocessor 2 is active. During DMA operations, the command outputs (MRDC, MWTC, IORC, and IOWC) are driven by the DMA control 38 shown in FIG. 2, the AOX* output is pulled to an inactive high, and the CMX* output is driven by the RAM SWMUX signal.

Both the CPUPAL 68 and BUSPAL 70 contain logic which senses the ready state of the system bus and adjusts the system timing accordingly.

Also shown in FIG. 8 is the BUFPAL 72 which is a 14 input, 8 output PAL device and is not clocked by any of the system clocks. THE BUFPAL 72 contains logic to control the various buffers and latches which implement the 16 to 8-bit bus conversions between the microprocessor 2 address/data busses (13, 11), and the address bus 58 and data bus 56. The signals which control this conversion are B8IN*, B8HOUT*, B8LOUT*, B8HLAT, and B8LLAT. THE BUFPAL 72 also contains logic to control the I/O data buffers (IODEN* and IODIR), and logic to control the generation of the standard system wait states on I/O and DMA operations (WAITCLK).

Figure 5:
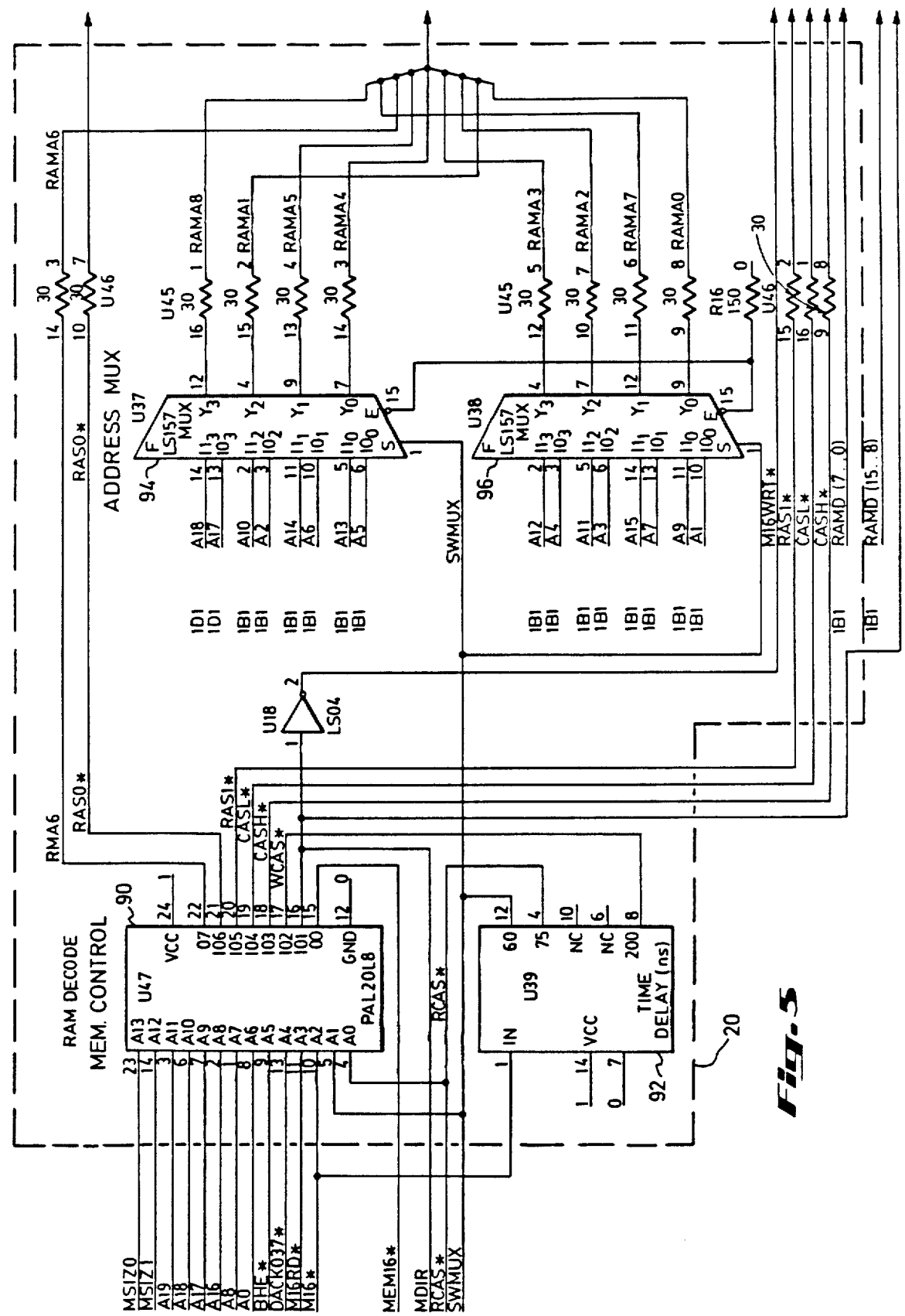
Figure 6A:
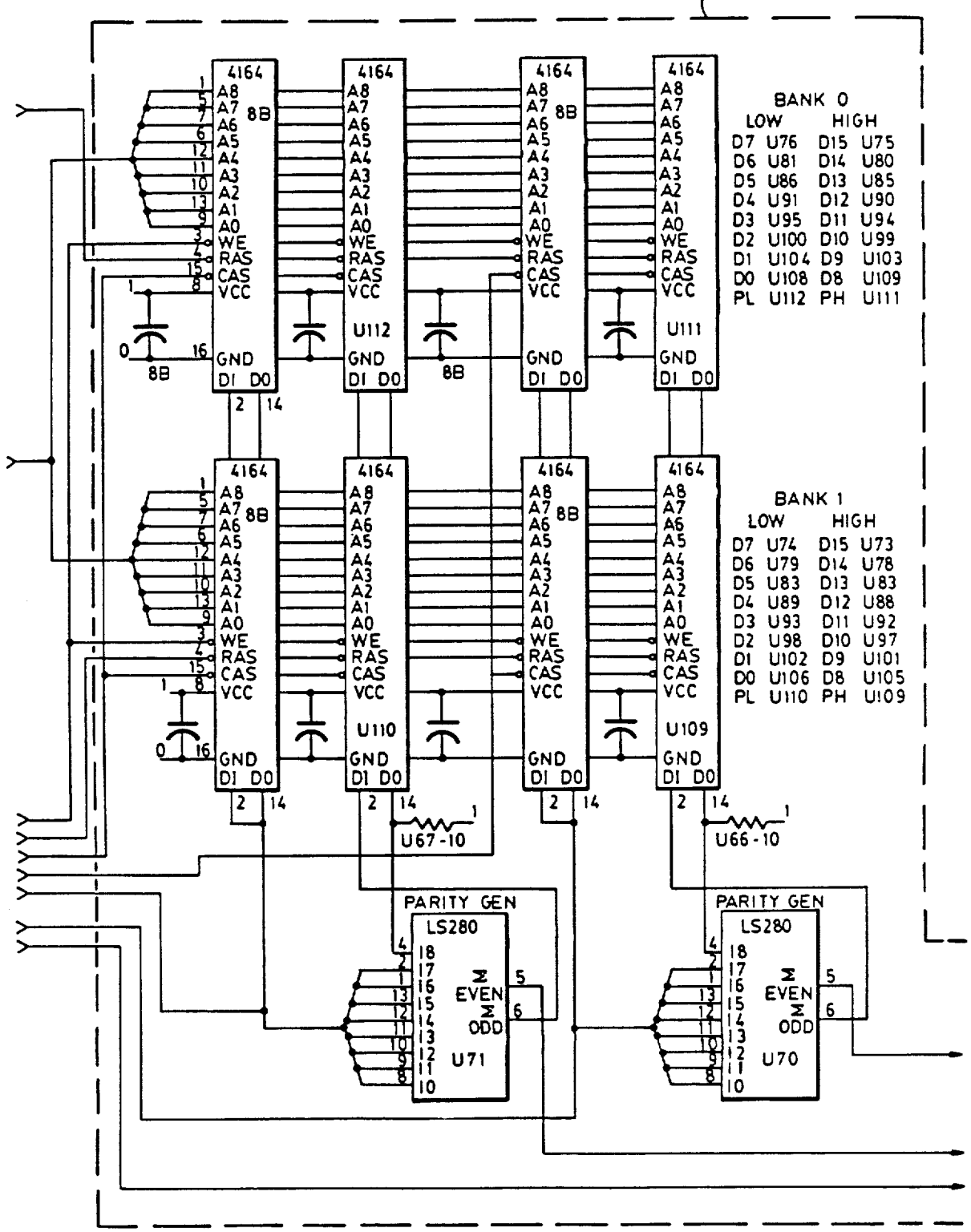

Turning now to FIGS. 5 and 6, and placing FIG.6 to the right of FIG. 5 a detailed circuit diagram of the RAM memory 14 and address MUX and memory control 20 as shown in FIG. 1 is illustrated. The RAM memory system 14 consists of two banks of 18 DRAM ICs. Each of the two banks is further split into a high and low sets of nine ICs each which correspond to the high and low bytes of a microprocessor 2 word. Parity checking is done on each set individually to allow single byte or word accesses to the RAM memory 14. The RAM memory 14 timing is developed asynchronously with a delay line to allow RAM access at each of the two microprocessor 2 clock speeds and from the DMA control 38.

FIG. 5 is an illustration of the address multiplexer and memory control logic 20 as shown in FIG. 1. The address MUX and memory control 20 comprises a control pal MEMPAL or memory control PAL 90, a delay line 92, a pair of address multiplexers 94, 96, whose output signal lines contain series damping resistors as do the control lines from the MEMPAL 90. The output from the multiplexers 94, 96, and the MEMPAL 90 are applied directly to the array of DRAM chips shown in FIG. 6.

The RAM memory 14 read cycle begins when the CPUPAL 68 recognizes the status of a memory read and sets the M16* and M16RD* signals active. The M16* signal directly drives the TTL delay line 92 and the MEMPAL 90 to begin the access cycle. The MEMPAL 90 decodes the address produced by the microprocessor 2 and enables the appropriate RASx* output to strobe in the row address to the DRAM in RAM array 14. When the M16* signal has propagated through the delay line 92 to generate the signal SWMUX output, the SWMUX signal changes the address to the DRAM array 14 from row to column. After another 15 nanoseconds delay in the delay line, the RCAS* line becomes active. Since the M16RD* signal is active, the MEMPAL 90 decodes the bus status to determine which CASx* to enable as RCAS* becomes true. The DRAM array 14 then completes the access and sends the data to the microprocessor 2. At the end of the cycle, the parity status is clocked and latched if there was a parity error on the read cycle.

The data buffers 16, 18 are enabled by the RCAS* line 75 nanoseconds after the M16* line goes active. This allows time for the microprocessor 2 to disable its multiplexed address buffers to prevent a bus clash. The direction line to the data buffer (MDIR) comes on before the RCAS* line and is held on after all RCAS* goes away to insure that the direction is always correct. The MDIR line is also used to clock in the parity status because it is only present on the read cycle and it goes high at the very end of the read cycle allowing enough time to calculate the parity after data is available.

The RAM memory array 14 is refreshed by the DMA controller 38 about every 15 microseconds. The refresh cycle is different than other DMA memory read cycles in that it is shorter (2 DCLK cycles) and in that the RAM is not actually read. Also, the MEMPAL 90 causes both banks of RAM chips to be cycled at once so it is not necessary to specifically address each bank when refreshing. The MEMPAL 90 prevents any CASx* strobes from occurring during refresh, preventing any actual reading or writing of the RAMS.

Figure 9:
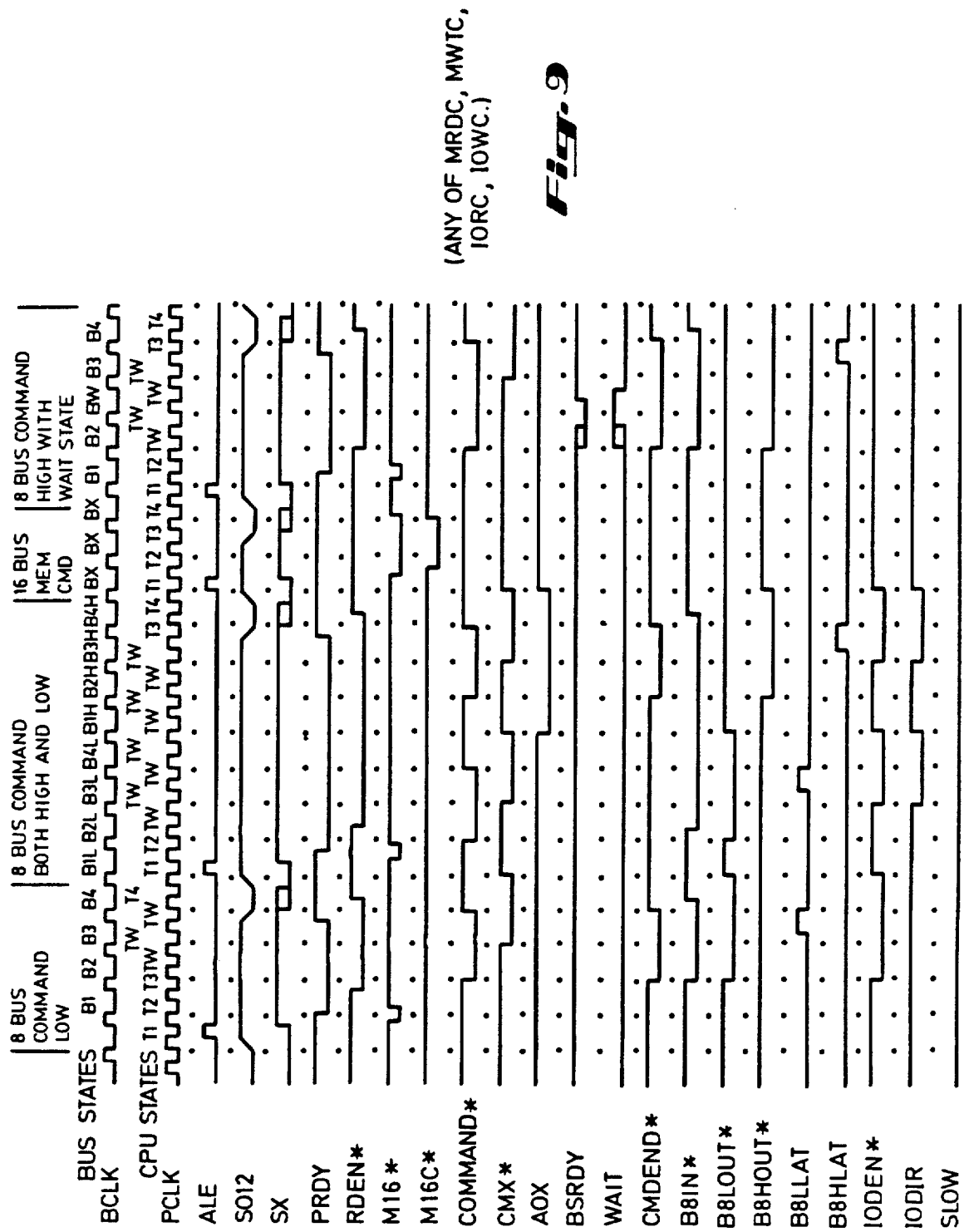
FIG. 9 is a timing diagram for various signals of the present invention which occur during different cycle operations when the microprocessor chip set is operating in the FAST mode.
Figure 10:
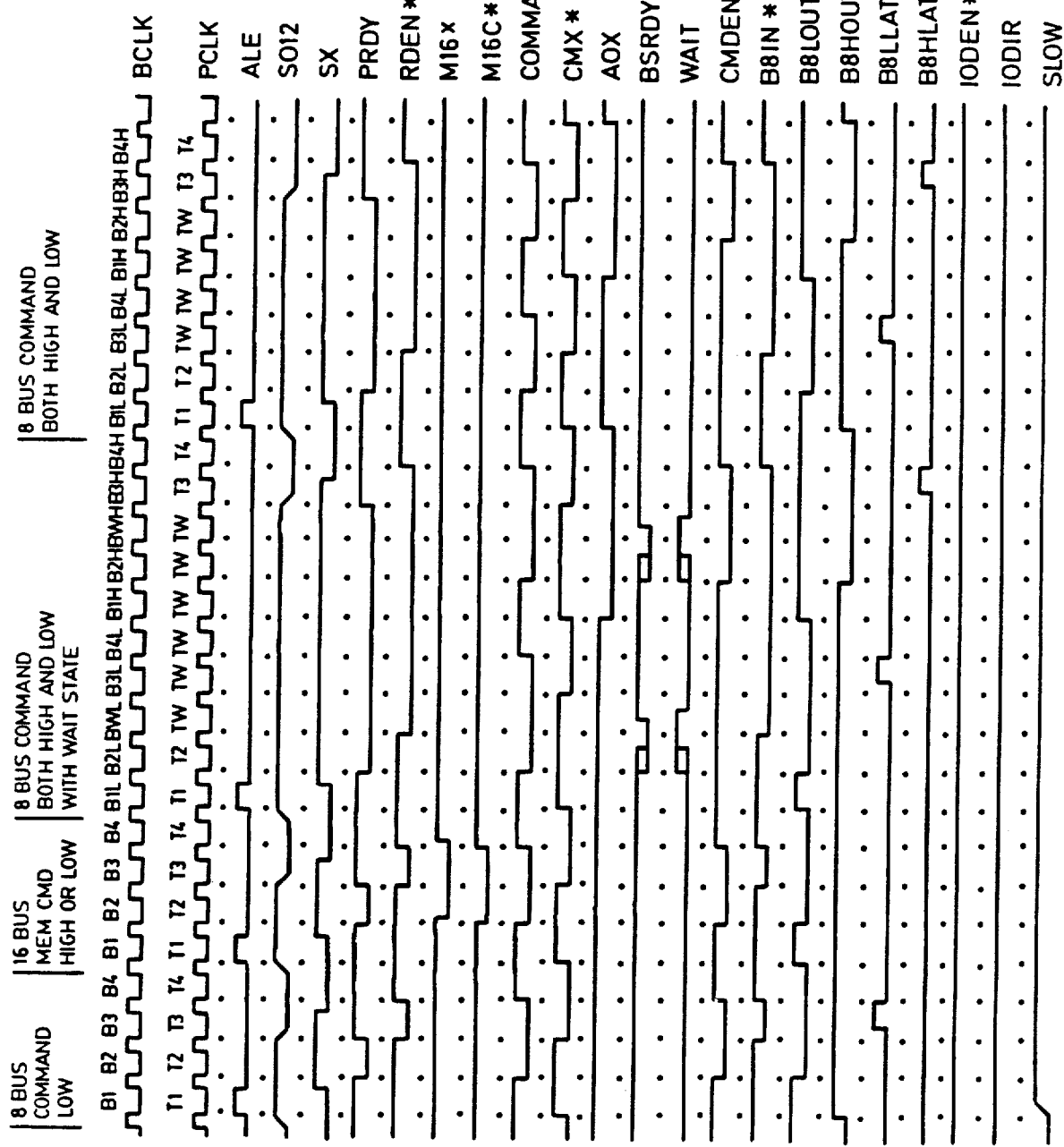
FIG. 10 is a timing diagram of various cycle operations for the microprocessor chip set when operating in the SLOW mode.

Turning now to FIGS. 9 and 10, there are shown the timing diagram for the basic command cycles which occur in the FAST mode (FIG. 9) and in the SLOW mode (FIG. 10). The following Table I provides listing of the basic cycle types which can occur in the present invention.

TABLE I

| PROCESSOR CYCLE TYPES | | |
|---|---|---|
| FAST CPU MEM READ | 16 RAM | LOW BYTE |
| FAST CPU MEM READ | 16 RAM | HIGH BYTE |
| FAST CPU MEM READ | 16 RAM | WORD |
| FAST CPU MEM READ | 8 BUS | LOW BYTE |
| FAST CPU MEM READ | 8 BUS | HIGH BYTE |
| FAST CPU MEM READ | 8 BUS | WORD LOW BYTE |
| FAST CPU MEM READ | 8 BUS | WORD HIGH BYTE |
| FAST CPU MEM WRITE | 16 RAM | LOW BYTE |
| FAST CPU MEM WRITE | 16 RAM | HIGH BYTE |
| FAST CPU MEM WRITE | 16 RAM | WORD |
| FAST CPU MEM WRITE | 8 BUS | LOW BYTE |
| FAST CPU MEM WRITE | 8 BUS | HIGH BYTE |
| FAST CPU MEM WRITE | 8 BUS | WORD LOW BYTE |
| FAST CPU MEM WRITE | 8 BUS | WORD HIGH BYTE |
| FAST CPU I/O READ | 8 BUS | LOW BYTE |
| FAST CPU I/O READ | 8 BUS | HIGH BYTE |
| FAST CPU I/O READ | 8 BUS | WORD LOW BYTE |
| FAST CPU I/O READ | 8 BUS | WORD HIGH BYTE |
| FAST CPU I/O WRITE | 8 BUS | LOW BYTE |
| FAST CPU I/O WRITE | 8 BUS | HIGH BYTE |
| FAST CPU I/O WRITE | 8 BUS | WORD LOW BYTE |
| FAST CPU I/O WRITE | 8 BUS | WORD HIGH BYTE |
| FAST CPU INTA READ | 8 BUS | LOW BYTE |
| FAST CPU INTA READ | 8 BUS | HIGH BYTE |
| FAST CPU HALT | | |
| SLOW CPU MEM READ | 16 RAM | LOW BYTE |
| SLOW CPU MEM READ | 16 RAM | HIGH BYTE |
| SLOW CPU MEM READ | 16 RAM | WORD |
| SLOW CPU MEM READ | 8 BUS | LOW BYTE |
| SLOW CPU MEM READ | 8 BUS | HIGH BYTE |
| SLOW CPU MEM READ | 8 BUS | WORD LOW BYTE |
| SLOW CPU MEM READ | 8 BUS | WORD HIGH BYTE |
| SLOW CPU MEM WRITE | 16 RAM | LOW BYTE |
| SLOW CPU MEM WRITE | 16 RAM | HIGH BYTE |
| SLOW CPU MEM WRITE | 16 RAM | WORD |
| SLOW CPU MEM WRITE | 8 BUS | LOW BYTE |
| SLOW CPU MEM WRITE | 8 BUS | HIGH BYTE |
| SLOW CPU MEM WRITE | 8 BUS | WORD LOW BYTE |
| SLOW CPU MEM WRITE | 8 BUS | WORD HIGH BYTE |
| SLOW CPU I/O READ | 8 BUS | LOW BYTE |
| SLOW CPU I/O READ | 8 BUS | HIGH BYTE |
| SLOW CPU I/O READ | 8 BUS | WORD LOW BYTE |
| SLOW CPU I/O READ | 8 BUS | WORD HIGH BYTE |
| SLOW CPU I/O WRITE | 8 BUS | LOW BYTE |
| SLOW CPU I/O WRITE | 8 BUS | HIGH BYTE |
| SLOW CPU I/O WRITE | 8 BUS | WORD LOW BYTE |
| SLOW CPU I/O WRITE | 8 BUS | WORD HIGH BYTE |
| SLOW CPU INTA READ | 8 BUS | LOW BYTE |
| SLOW CPU INTA READ | 8 BUS | HIGH BYTE |
| SLOW CPU HALT | | |
| DMA MEM READ | 16 RAM | LOW BYTE |
| DMA MEM READ | 16 RAM | HIGH BYTE |
| DMA MEM READ | 8 BUS | LOW BYTE |
| DMA MEM READ | 8 BUS | HIGH BYTE |

TABLE I-continued

| PROCESSOR CYCLE TYPES | | |
|---|---|---|
| DMA MEM WRITE | 16 RAM | LOW BYTE |
| DMA MEM WRITE | 16 RAM | HIGH BYTE |
| DMA MEM WRITE | 8 BUS | LOW BYTE |
| DMA MEM WRITE | 8 BUS | HIGH BYTE |

In the following discussion, references to "16 BUS" or "16 RAM" refer to the 16-bit bus comprised of the microprocessor 2 address/data line AD15...0 (busses 13 and 11 as shown in FIG. 1). Reference to "8 BUS" refer to the 8-bit I/O bus 54 also shown in FIG. 1.

Referring now to FIG. 9, there is shown the timing diagram for the microprocessor 2 cycle types for the FAST mode of operation. Basically, there are two types of bus accesses in the FAST mode. The first is an access to the 16-bit memory 14, and the other is to everything else which involves 8-bit accesses. When accessing the 16-bit RAM memory 14, the controller state machines let the microprocessor 2 run at full speed. The 16-bit memory cycle begins when the status indicates a memory operation. As soon as the signal SX goes active, the CPUPAL 68 sets the M16* signal active signaling the beginning of the RAM memory 14 cycle. If the operation is a read, the signal M16RD* also goes active. On the rising edge of the PCLK*, the signal M16C* goes active. The M16C* signal is used internally to the CPUPAL 68 to hold M16* and M16RD* active until the end of the command. On this 16-bit access cycle, the PRDY line stays high so that the microprocessor 2 will not generate any wait states. If the microprocessor 2 status indicates that only one byte (high or low) of the 16-bit memory 14 is to be accessed, then the MEMPAL 90 will decode this and activate only the CAS* line for this specific half of the RAM memory array 14.

For non 16-bit RAM memory 14 accessed, due to the early start of the memory cycle, there are some particular effects that need to be discussed. All memory cycles begin when the status indicates a memory operation. As soon as SX goes active, the CPUPAL 62 sets the M16* line active signaling the beginning of the RAM cycle. This occurs regardless of the address because the address is not guaranteed to be present early in the cycle. For non 16-bit memory accesses, the M16C* line will not go active on the rising edge of PCLK* and PRDY will go inactive. This is because M16C* and PRDY are fully qualified with the address through the MEM16* signal from the MEMPAL 90 (indicating a 16-bit memory access). In this case, the PRDY line going inactive will disable M16* after the rising edge of PCLK*. The resulting short edge on M16* (15 nanoseconds) will be ignored by the MEMPAL 90, and the 16-bit memory subsystem because of further address qualification within the MEMPAL 90.

Still referring to FIG. 9, when accessing the 8-bit bus 54 for a single byte, the CPUPAL 68 sets the PRDY line low immediately on the rising edge of PCLK* during interval T2. On the rising edge of CCLK, the BUSPAL 70 will generate the command that is indicated by the status (B2). Note that there may be from one to three MCLK cycles before the command starts due to the synchronization requirement between the two state machines. The BUSPAL 70 sets CMX* low on the next falling edge of all CCLK if the WAIT line is inactive (B3). If the WAIT line is active, the BUSPAL 70 will enter this BUS WAIT state (BW) until WAIT goes inactive. During this time, the CPUPAL 68 has the microprocessor 2 in WAIT state (TW). On the rising edge of CCLK at (B4), the command is made inactive.

Because the cycle is a single byte access, the BUSPAL 70 sets the CMDEND* line active during B2. When the CPUPAL 68 recognizes that both CMDEND* and CMX* are active, it will allow the PRDY line to go active on the next rising edge of PCLK* at T3. This is subject to one or two MCLK cycles of synchronization delay. The microprocessor 2 status will then go inactive to end the access at T4. The signal CMX* will stay active during the bus interval B4 and will be used to hold some of the data buffers active to provide a data hold time for system write.

If the 8-bit bus cycle being executed involves word operation, then two cycles are run on the 8-bit bus 54. The low byte is accessed first, followed by the high byte. Initially, the CPUPAL 68 sets the PRDY signal low immediately on the rising edge of PCLK* during T2. On the next rising edge of CCLK, the BUSPAL 70 will generate the command that is indicated by the status at B2L time. Note that there may be from one to three MCLK cycles before the command starts due to synchronization requirements of the two state machines. During the remainder of the cycle, the CPUPAL 68 has the microprocessor 2 in a WAIT state TW.

The BUSPAL 70 sets CMX* low on the next falling edge of CCLK if the WAIT line is inactive at B3L time. If the WAIT signal is active, the BUSPAL 70 will enter the bus WAIT state BWL until WAIT goes inactive. On the rising edge of CCLK at B4L time, the command is made inactive.

At the beginning of the next clock at BIH time, the signal AOX is set low and the CMX* signal is set high. The signal AOX is used to force the address lines A0B sent to the system address bus to a logic high even though the microprocessor 2 A0 address line is low. This changes the address for the second half of the word access. At the next CCLK clock, a second command and the CMDEND* line is made active (B2H).

At this time, the BUSPAL 70 sets CMX* low on the next falling edge of CCLK if the WAIT signal is inactive (B3H). If the WAIT line is active, the BUSPAL 70 will enter the bus WAIT state (BWH) until WAIT goes inactive. On the rising edge of CCLK at B4H time, the command is made inactive.

When the CPUPAL 68 recognizes that both CMDEND* and CMX* are active (B3H), it will allow the PRDY line to go active on the next rising edge of PCLK* at T3 time. This is subject to one or two MCLK cycles of synchronization delay. The microprocessor 2 status will then go inactive to the access (T4). The signal CMX* will stay active during bus B4H time as in the single byte access case. At the end of B4H, both CMX* and AOX will go inactive thus ending the word access.

Turning now to FIG. 10, there is shown the timing diagram for the basic microprocessor 2 command cycles for the SLOW mode of operation. In the SLOW mode, the clocks driving the CPUPAL 68 and the BUSPAL 70 are the same, so they may be treated as one large state machine. In addition, both clocks are at the system bus speed (4.77 MHz) so there is no requirement to slow the microprocessor 2 down to make accesses on the 8-bit bus 54. In accordance with the present invention, to more closely simulate the execution speed of the slow microprocessor by the fast microprocessor 2, the state machines treat some of the word accesses to the 16-bit memory 14 as byte accesses. In other words, two identical cycles are run for word accesses instead of actually operating on one-half and then the other.

It has been determined that to most closely simulate the running of an application program on the slow microprocessor out of the 16-bit RAM memory 14, some of the fetches need to be word operations in order to increase the average speed of the microprocessor 2. This is because the microprocessor 2 internal queue is longer than the internal queue of the slower microprocessor. The fast microprocessor tends to spend more time fetching instructions to fill its internal pre-fetch queue. To achieve this average, word instruction fetches which fall on an address boundary such that address line A1 is a logic high, are processed as word operations in the 16-bit memory 14. All other fetches, reads and writes are done as byte operations in accordance with the above procedure, i.e., two consecutive 16-bit RAM 14 accesses with the first access ignored.

Still referring to FIG. 10, when accessing the 8-bit bus 54 for a single byte, the CPUPAL 68 sets the PRDY line low immediately on the rising edge of PCLK* during T2. At the same time, the BUSPAL 70 will generate the command that is indicated by the status(B2). The BUSPAL 70 sets CMX* low on the next falling edge of CCLK if the WAIT line is inactive (B3). If the WAIT line is active, the BUSPAL 70 and CPUPAL 68 will enter a wait state (TW, BW) until WAIT goes inactive. On the rising edge of CCLK at (T4, B4) the command is made inactive.

Because the cycle is a single byte access, the BUSPAL 70 sets the CMDEND* line active during (T2, B2). When the CPUPAL 68 recognizes the CMDEND* is active and WAIT is inactive, it will allow the PRDY line to go active at the beginning of (T3, B3). The CPU status will then go inactive to end the access (T4). CMX* will stay active during (T4, B4) and is used to hold some of the data buffers active to provide a data hold time for system writes.

If the 8-bit bus cycle being executed involves a word operation, two cycles are run on the 8-bit bus 54. Initially, the CPUPAL 68 sets the PRDY line low immediately on the rising edge of PCLK* during T2. At the same time the BUSPAL 70 will generate the command that is indicated by the status (B2L). During the remainder of the word cycle the CPUPAL 68 has the microprocessor 2 in a wait state (TW).

The BUSPAL 70 sets CMX* low on the next falling edge of CCLK if the WAIT line is inactive (B3L). If the WAIT line is active the BUSPAL 70 will enter the BUS wait state (BWL) until wait goes inactive. On the rising edge of CCLK at (B4L) the command is made inactive.

At the beginning of the next clock (BIH) the AOX line is set low and the CMX* line is set high. The AOX line is used to force the address line AOB sent to the system address bus to a high even though the CPU AO line is low. This changes the address for the second half of the word access. At the next CCLK a second command and the CMDEND* line is made active (B2H). The BUSPAL 70 sets CMX* low on the next falling edge of CCLK if the WAIT line is inactive (B3H). If the WAIT line is active the BUSPAL 70 will enter the BUS wait state (BWH) until wait goes inactive. On the rising edge of CCLK at (B4H) the command is made inactive.

When the CPUPAL 68 recognizes that CMDEND* is active and WAIT is inactive (B3H), it will allow the PRDY line to go active (T3). The microprocessor 2 status will then go inactive to end the access (T4). The second CMX* will stay active during bus B4H as in the single byte access case. At the end of B4H, both CMX* and AOX will go inactive (high) thus ending the word access.

When accessing the 16-bit memory 14 in the SLOW mode, the controller state machines (CPUPAL 68 and BUSPAL 70) do not attempt to start the memory cycle early. Instead the M16C* line is set active on the rising edge of CCLK following SX becoming active. This results in M16* going active and, if the status indicated a read operation, M16RD* goes active. Both of these signals are fully qualified by the MEM16* signal from the MEMPAL 90 which indicates a valid 16-bit address. In other respects, the 16-bit memory cycles are the same as those for the 8-bit described above.

Referring once again to FIG. 8, the data buffers which direct the data between the 16-bit bus (busses 11 and 13) and the 8-bit system bus 54 are controlled by the BUFPAL 72 shown in FIG. 8. The following TABLE 2 shows which buffers and latches are enabled from the output signals from BUFPAL 72 during what commands.

TABLE 2

| PROCESSOR CYCLE TYPES | | B8IN* | B8LOUT* | B8HOUT* | B8LLAT | B8HLAT |
|---|---|---|---|---|---|---|
| CPU NO COMMAND | | H | H | H | L | L |
| CPU MEM READ | 16 RAM | H | H | H | L | L |
| CPU MEM READ | 8 BUS LOW BYTE | L | H | H | H | L |
| CPU MEM READ | 8 BUS HIGH BYTE | L | H | H | L | H |
| CPU MEM WRITE | 16 RAM | H | H | H | L | L |
| CPU MEM WRITE | 8 BUS LOW BYTE | H | L | H | L | L |
| CPU MEM WRITE | 8 BUS HIGH BYTE | H | H | L | L | L |
| CPU I/O READ | 8 BUS LOW BYTE | L | H | H | H | L |
| CPU I/O READ | 8 BUS HIGH BYTE | L | H | H | L | H |
| CPU I/O WRITE | 8 BUS LOW BYTE | H | L | H | L | L |
| CPU I/O WRITE | 8 BUS HIGH BYTE | H | H | L | L | L |
| CPU INTA READ | 8 BUS LOW BYTE | L | H | H | H | H |
| CPU INTA READ | 8 BUS HIGH BYTE | L | H | H | H | H |
| CPU HALT | | H | H | H | L | L |
| DMA NO COMMAND | | H | H | H | H | H |
| DMA MEM READ | 16 RAM LOW BYTE | H | L | H | H | H |
| DMA MEM READ | 16 RAM HIGH BYTE | H | H | L | H | H |
| DMA MEM READ | 8 BUS | H | H | H | H | H |
| DMA MEM WRITE | 16 RAM LOW BYTE | L | H | H | H | H |
| DMA MEM WRITE | 16 RAM HIGH BYTE | L | H | H | H | H |
| DMA MEM WRITE | 8 BUS | H | H | H | H | H |

When the B8IN* signal goes active during a microprocessor 2 read cycle, it is held on slightly after the read command goes away until the RDEN* goes inactive. This is to guarantee that data will be presented to the microprocessor with the required setup and hold time particularly in the FAST mode when the read command can go away before the microprocessor 2 samples the data (due to state machine synchronization).

When a B8xOUT* line goes active during a write cycle, it is held on after the write command goes away until the CMX * line goes inactive. This keeps the data present on the bus to help satisfy the required write hold times of most peripherals. During microprocessor 2 writes, this is a complete BLCK* cycle. During DMA reads, this is 75 nanoseconds after the read command goes away (controlled by the RAM delay line).

The B8xLAT* signals are used for two purposes. The first is to hold the result of a low byte bus read when a full word is being read. The second purpose is to latch and hold read data at the end of a read command until the microprocessor 2 is ready for it. This could be either zero to one MCLK cycle times depending on the synchronization of BLCK* and PCLK*.

In order to properly latch the data from the system bus, the data must be present for a certain hold time from the read command on the bus. In order to minimize this hold time, the BUFPAL 72 uses CCLK going low to gate the latch signals. Since CCLK,s rising edge causes the read commands (MRDC* and IORC*) to end, this provides the earliest possible time to latch the latches.

In describing the invention, reference has been made to a preferred embodiment. However, those skilled in the art and familiar with the disclosure of the invention may recognize additions, deletions, substitutions, or other modifications which would fall within the purview of the invention as defined in the appended claims.

APPENDIX FOR
PAL DESIGN DATA

```
PAL20L8
MEMPAL
MEMORY CONTROL PAL                                      PAUL R. CULLEY    01/31/84
COMPAQ COMPUTER HOUSTON, TEXAS
A8      A16 A19     /RCAS SWMUX A18   A17    A0    /BHE  /M16  /M16RD GND
/DACK0  MS1 /MEM16  MDIR  /WCAS /CASH /CASL /RAS1 /RAS0 RAMA6 MS0    VCC

IF (VCC)
MEM16  =  /MS1  *            /A19                       ;640K, 512K (BANK 1) 256K*2
       +  /MS1  * /MS0  *  A19 * /A18 * /A17            ;640K (BANK 0) 64K*2
       +   MS1  *            /A19 * /A18 * /A17         ;256K (BANK 0) 64K*2
       +   MS1  *   MS0  * /A19 * /A18 *  A17           ;256K (BANK 1) 64K*2
       +  DACK0                                         ;REFRESH

IF (VCC)
RAS0   =  M16 * /MS0 * /MS1 *  A19 * /A18 * /A17        ;640K SEL 64K BANK UPPER
       +  M16 *              MS1 * /A19 * /A18 * /A17   ;128K, 256K SEL 64K BANK LOWER
       +  M16 * DACK0                                   ;REFRESH
       + /SWMUX * RAS0                                  ;EXTEND BY 50 NSEC

IF (VCC)
RAS1   =  M16 *         /MS1 * /A19                     ;640K, 512K SEL 256K BANK
       +  M16 *  MS0 *  MS1 * /A19 * /A18 *  A17        ;256K SEL 64K BANK UPPER
       +  M16 * DACK0                                   ;REFRESH
       + /SWMUX * RAS1                                  ;EXTEND BY 50 NSEC

IF (VCC)
CASL   = /A0  * M16RD  * RCAS * /DACK0 * M16 * RAS0     ;READ CAS LOW BYTE BK 0
       + /A0  * M16RD  * RCAS * /DACK0 * M16 * RAS1     ;READ CAS LOW BYTE BK 1
       + /A0  * /M16RD * WCAS * /DACK0 * M16            ;WRITE CAS LOW BYTE
       + RCAS * CASL   * WCAS                           ;EXTEND CAS BY 75 NSEC

IF (VCC)
CASH   =  A0  * M16RD  * RCAS * /DACK0 * M16 * RAS0     ;READ CAS HIGH BYTE DMA BK 0
       +  A0  * M16RD  * RCAS * /DACK0 * M16 * RAS1     ;READ CAS HIGH BYTE DMA BK 1
       + BHE  * M16RD  * RCAS * /DACK0 * M16 * RAS0     ;READ CAS HIGH BYTE CPU BK 0
       + BHE  * M16RD  * RCAS * /DACK0 * M16 * RAS1     ;READ CAS HIGH BYTE CPU BK 1
       +  A0  * /M16RD * WCAS * /DACK0 * M16            ;WRITE CAS HIGH BYTE DMA
       + BHE  * /M16RD * WCAS * /DACK0 * M16            ;WRITE CAS HIGH BYTE CPU
       + RCAS * CASH   * WCAS                           ;EXTEND CAS BY 75 NSEC

IF (VCC)
/MDIR  = M16RD                                          ;CHANGE DIRECTION ON READ
       + /MDIR * RCAS                                   ;EXTEND BY 75 NSEC FROM READ
```

```
IF (VCC)
 /RAMA6 = /A8 * SWMUX * /DACK0             ;NORMAL ROW ADDRESS
        + /A16 * /SWMUX                    ;NORMAL COL ADDRESS
        + /A0 * SWMUX * DACK0              ;REFRESH ROW ADDRESS

IF (GND)
 WCAS = GND

CK   /S2  /MRDC   /MWTC   /CMX /CMDEND /MEM16 SX   HRQ /RQGT /S1   GND
/OE WAIT /M16RD /RDEN   PRDY /PAEN     /WGT  /M16C /RQ /M16  SLOW VCC

/PRDY := /SLOW * /RDEN * PRDY * /CMX * /CMDEND   ;WHEN FAST AND NO CYCLE
          * SX * /S2 * /MEM16                     ; WAIT ON NON 16 MEMORY CYCLES
        + /SLOW * /RDEN * PRDY * /CMX * /CMDEND   ;WHEN FAST AND NO CYCLE
          * SX * S2                               ; WAIT ON ALL OTHER CYCLES
        + /SLOW * /PRDY * /CMX                    ;UNTIL BOTH CMX AND
        + /SLOW * /PRDY * /CMDEND                 ; CMDEND SIGNAL END OF COMMAND
        +  SLOW * SX * PRDY                       ;ALWAYS SET NOT READY WHEN SLOW
        +  SLOW * SX * /PRDY * /CMDEND            ;HOLD UNTIL CMD END and
        +  SLOW * SX * /PRDY * WAIT               ;HOLD UNTIL BUS IS READY RDEN := /PRDY                              ;DELAYED VERSION OF PRDY
        +  MRDC * MWTC                       ;FOR TESTING

M16C := SX * /S2                           ;WHEN A 16 MEM CPU CYCLE OCCURS

RQ   := HRQ * PAEN * /WGT * /RQ            ;REQUEST HOLD WHEN CPU ACTIVE AND HRQ
        + /HRQ * /PAEN * WGT * /RQ           ;SEND RELEASE WHEN HRQ GOES AWAY
        +  MRDC * MWTC                       ; FOR TESTING

WGT  := HRQ * PAEN * /WGT * RQ             ;WAIT FOR GRANT (XR -> XW) BEGINS
        + HRQ * PAEN * WGT * /RQ             ;WAITING FOR GRANT (XW)
        + /HRQ * /PAEN * /RQ                 ;HOLD REQ ENDS (XS, XD)
        +  MRDC * MWTC                       ; FOR TESTING

PAEN := /PAEN * WGT * RQ * /HRQ            ;CPU ENABLE BEGINS (XD -> XI)
        +  PAEN * /WGT                       ;HOLDS DURING IDLE (XI) AND REQUEST (XR
        +  PAEN * WGT * /RQ * HRQ * /RQGT    ;AND WHILE WAITING FOR GRANT (XW, XG)
        +  MRDC * MWTC                       ; FOR TESTING

IF (VCC)
  M16  = SX * /S2 * /M16C                    ;WHEN THE CPU WANTS THE MEMORY.
        + M16C * MEM16                       ;HOLD UNTIL END OF COMMAND CYCLE
        + MRDC * /PAEN * MEM16               ;DMA MEMORY READ
        + MWTC * /PAEN * MEM16               ;DMA MEMORY WRITE

IF (VCC)
  M16RD = MEM16 * SX * /S2 * S1              ;READ WHEN CPU WANTS READ MEMORY
        + MEM16 * MRDC * /PAEN               ;DMA MEMORY READ
        + M16 * M16RD * /MWTC                ;UNTIL M16 IS FINISHED

CK   NC  /S2    A0    /BHE  /S0  /MEM16 SX     PRDY /RDEN /S1   GND
/OE WAIT /A0X /IORC /IOWC /INTA /CMDEND /CMX /MWTC /MRDC SLOW VCC

MRDC := /SLOW * /CMX * /PRDY *             ;FAST, WHEN IN WAIT STATE
          /S2 * S1 * /MEM16                  ; AND 8 BUS MEM READ OR
        + SLOW * /CMX * SX *                 ;SLOW, WHEN STATUS OK
          /S2 * S1                           ; AND ANY MEM READ

MWTC := /SLOW * /CMX * /PRDY *             ;FAST, WHEN IN WAIT STATE
          /S2 * /S1 * S0 * /MEM16            ; AND 8 BUS MEM WRITE OR
        + SLOW * /CMX * SX *                 ;SLOW, WHEN STATUS OK
          /S2 * /S1 * S0                     ; AND ANY MEM WRITE

IORC := /SLOW * /CMX * /PRDY *             ;FAST, WHEN IN WAIT STATE
          S2 * S1 * /S0                      ; AND ANY I/O READ OR
        + SLOW * /CMX * SX *                 ;SLOW, WHEN STATUS OK
          S2 * S1 * /S0                      ; AND ANY I/O READ
```

```
IOWC  := /SLOW * /CMX * /PRDY *          ;FAST, WHEN IN WAIT STATE
          S2 * /S1 * S0                   ; AND ANY I/O WRITE OR
       +  SLOW * /CMX * SX *              ;SLOW, WHEN STATUS OK
          S2 * /S1 * S0                   ; AND ANY I/O WRITE

INTA  := /SLOW * /CMX * /PRDY *          ;FAST, WHEN IN WAIT STATE
          S2 * S1 * S0                    ; AND INTERRUPT ACK OR
       +  SLOW * /CMX * SX *              ;SLOW, WHEN STATUS OK
          S2 * S1 * S0                    ; AND INTERRUPT ACK

A0X   := /A0 * BHE * CMX * /A0X * /INTA *    ;HIGH ADDRESS OF WORD START
          /IOWC * /IORC * /MWTC * /MRDC * RDEN ; (B1H)
       + /CMX * A0X * RDEN                ;TILL CMD START (B2H,BWH,B3H)
       + CMX * A0X * INTA * RDEN          ;AFTER CMD END (B4H)
       + CMX * A0X * IOWC * RDEN          ;AFTER CMD END (B4H)
       + CMX * A0X * IORC * RDEN          ;AFTER CMD END (B4H)
       + CMX * A0X * MRDC * RDEN          ;AFTER CMD END (B4H)
       + CMX * A0X * MWTC * RDEN          ;AFTER CMD END (B4H)

CMDEND := /SLOW * /PRDY * A0              ;SINGLE CYCLE FAST HIGH (B2-B3)
       +  /SLOW * /PRDY * /BHE            ;SINGLE CYCLE FAST LOW (B2-B3)
       +  /SLOW * /PRDY * A0X * /A0 * BHE ;BOTH CYCLE FAST (B2H-B3H)
       +  SLOW * SX * A0                  ;SINGLE CYCLE SLOW HIGH (B2-B3)
       +  SLOW * SX * /BHE                ;SINGLE CYCLE SLOW LOW (B2-B3)
       +  SLOW * /A0 * BHE * /CMX * A0X * RDEN ;BOTH CYCLE SLOW (B2H-B2H)

CMX   := /WAIT * INTA                     ;8 BUS CYCLE COMMAND (B3,B4)
       + /WAIT * IORC                     ;8 BUS CYCLE COMMAND (B3,B4)
       + /WAIT * IOWC                     ;8 BUS CYCLE COMMAND (B3,B4)
       + /WAIT * MRDC                     ;8 BUS CYCLE COMMAND (B3,B4)
       + /WAIT * MWTC                     ;8 BUS CYCLE COMMAND (B3,B4)
PAL20L8
SUFPAL                                    PAUL R. CULLEY    01/31/84
BUFFER CONTROL PAL
COMPAQ COMPUTER HOUSTON, TEXAS
A8 A9 /MRDC /MWTC /CMX ROM /INTA /IOWC /IORC /JXCS A0B GND /PAEN /MEM16
B8HLAT /B8IN /B8LOUT /B8HOUT /IODEN B8LLAT /IODIR WAITCLK /RDEN VCC

IF (VCC)
B8IN   := MRDC * RDEN * PAEN * /MEM16    ;CPU READ MEM 8
       +  IORC * RDEN * PAEN              ;CPU READ I/O
       +  INTA * RDEN * PAEN              ;CPU READ INTERRUPT ACK
       +  B8IN * RDEN * PAEN              ;CPU IN HOLD TILL READY
       +  MWTC * /PAEN * MEM16            ;DMA WRITE TO MEM16

IF (VCC)
B8LOUT := MWTC * PAEN * /A0B * /MEM16    ;CPU WRITE MEM 8
       +  IOWC * PAEN * /A0B              ;CPU WRITE I/O
       +  MRDC * IOWC * /PAEN * /A0B * MEM16 ;DMA READ MEM16
       +  CMX * B8LOUT                    ;HOLD ENABLE AFTER CMD

IF (VCC)
B8HOUT := MWTC * PAEN * A0B * /MEM16     ;CPU WRITE MEM 8
       +  IOWC * PAEN * A0B               ;CPU WRITE I/O
       +  MRDC * IOWC * /PAEN * A0B * MEM16 ;DMA READ MEM16
       +  CMX * B8HOUT                    ;HOLD ENABLE AFTER CMD

IF (VCC)
/B8LLAT := /MRDC * /IORC * /INTA * PAEN  ;HOLD WHEN NO READ CPU CMD
       +    MRDC * /IORC * /INTA * PAEN * A0B  ;HOLD WHEN READING HIGH BYTE
       +   /MRDC *  IORC * /INTA * PAEN * A0B  ;HOLD WHEN READING HIGH BYTE

IF (VCC)
/B8HLAT := /MRDC * /IORC * /INTA * PAEN  ;HOLD WHEN NO READ CPU CMD
       +    MRDC * /IORC * /INTA * PAEN * /A0B ;HOLD WHEN READING LOW BYTE
       +   /MRDC *  IORC * /INTA * PAEN * /A0B ;HOLD WHEN READING LOW BYTE

IF (VCC)
```

```
IODEN  := MRDC  * PAEN  * ROM                  ;ROM MEMORY READ
       + IORC  * PAEN  * /A9 * /A8             ;BOARD I/O READ
       + INTA  * PAEN                          ;INTERRUPT ACK READ
       + JXCS  * PAEN                          ;SPECIAL SLOT READ
       + MWTC  * PAEN                          ;ALL MEMORY WRITES
       + IOWC  * PAEN                          ;ALL I/O WRITES
       + CMX   * PAEN  * IODEN                 ;HOLD ENABLE AFTER CMD GO AWAY

IF (VCC)
IODIR  := MRDC  * PAEN  * ROM                  ;ROM MEMORY READ
       + IORC  * PAEN  * /A9 * /A8             ;BOARD I/O READ
       + INTA  * PAEN                          ;INTERRUPT ACK READ
       + JXCS  * PAEN                          ;SPECIAL SLOT READ
       + PAEN  * IODEN * IODIR                 ;EXTEND DIR TILL ENABLE GONE

IF (VCC)
/WAITCLK := MRDC * /IORC * /IOWC * PAEN        ;DONT WAIT ON CPU READS
         + /MRDC * /IORC * /IOWC               ;OR WHEN WAIT CMDS ARE INACTIVE
```

What is claimed is:

1. A personal computer having a high speed microprocessor responsive to a mode select signal for executing applications programs, in either a FAST mode or a SLOW mode, where the high speed microprocessor is software compatible with a slow speed microprocessor, the high speed microprocessor having an internal pre-fetch queue, the high than the pre-fetch queue on a slow speed microprocessor, said computer further comprising:

(a) a RAM memory having addressable memory word locations comprising a plurality of bytes;

(b) a clock generator responsive to the mode select signal for generating the clocking signals to said high speed microprocessor such that
  (i) in the slow mode, the clocking frequency is approximately the same as the normal clocking frequency for a slow micro-processor, and
  (ii) in the FAST mode, the clocking frequency is higher than the normal clocking frequency for a slow microprocessor;

(c) logic means responsive to the mode select signal and said clock generator for controlling the wait state of said high speed microprocessor when in the SLOW speed mode so that every other word access to the RAM memory by the high speed microprocessor requires two consecutive word fetches to the same memory address to obtain the contents of the location addressed thereby enabling the high speed microprocessor to execute application programs prepared for a slow speed microprocessor in the SLOW mode, on an average, at substantially the same speed as the program normally runs an applications software package on a slow speed microprocessor; and (d) switching means to switch the clocking frequency to SLOW mode during any Direct Memory Access (DMA) cycle.

2. The personal computer set forth in claim 1 further comprising:

(a) monitoring means to monitor a bus clock (BCLK) frequency;

(b) monitoring means to monitor a master clock (MCLK) frequency;

(c) monitoring means to monitor a system clock (PCLK) frequency;

(d) comparison means to functionally compare the phase relationship between the bus clock (BCLK) and the system clock (PCLK); and (e) switching means to switch the microprocessor from FAST to SLOW mode when the phase relationship of the bus clock (BCLK) and the system clock (PCLK) is such that the system clock (PCLK) has just gone low and will remain low for only two master system clock (MCLK) cycles after the speed mode change.

3. A personal computer having a high speed microprocessor responsive to a mode select signal for microprocessor) in either the FAST mode of a SLOW mode, the high speed microprocessor having an internal pre-fetch queue, said computer further comprising:

(a) a RAM memory having addressable memory word locations comprised of a plurality of bytes;

(b) a clock generator responsive to the mode select signal for generating a SLOW mode clock rate and a FAST mode clock rate, wherein the clock rates affect the operating speed of the microprocessor;

(c) logic means responsive to the mode select signal and the clock rate for controlling the wait state of the high speed microprocessor when it is in the SLOW speed mode wherein following a program jump by the microprocessor the logic means implements a word fetch cycle in which two bytes of a pre-fetch data are obtained followed by a word cycle fetch which is ignored by the microprocessor (the microprocessor is in WAIT state) followed by the same request which is not ignored by the microprocessor (microprocessor released from wait state); the second request is used to obtain the next two bytes of the pre-fetch queue and followed by an additional word cycle continuing until the microprocessor pre-fetch queue is filled;

(d) logic means to monitor said microprocessor for the initiation of a Direct Memory Access (DMA) cycle; and (e) switching means to switch the clocking frequency during any Direct Memory Access (DMA) cycle.

4. The personal computer set forth in claim 3 further comprising:

(a) monitoring means to monitor a bus clock (BCLK) frequency;

(b) monitoring means to monitor a master clock (MCLK) frequency;

(c) monitoring means to monitor a system clock (PCLK) frequency;

(d) comparison means to functionally compare the phase relationship between the bus clock (BCLK) and the system clock (PCLK); and
(e) switching means to switch the microprocessor from FAST to SLOW mode when the phase relationship of the bus clock (BCLK) and the system clock (PCLK) is such that the system clock (PCLK) has just gone low and will remain low for only two master system clock (MCLK) cycles after the speed mode change.

* * * * *